US012562871B2

(12) United States Patent
Lee et al.

(10) Patent No.: US 12,562,871 B2
(45) Date of Patent: Feb. 24, 2026

(54) METHOD FOR TRANSMITTING AND RECEIVING SIGNAL IN WIRELESS COMMUNICATION SYSTEM, AND APPARATUS FOR SUPPORTING SAME

(71) Applicant: LG ELECTRONICS INC., Seoul (KR)

(72) Inventors: Jeongsu Lee, Seoul (KR); Seunggye Hwang, Seoul (KR); Hyunsoo Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 283 days.

(21) Appl. No.: 18/300,946

(22) Filed: Apr. 14, 2023

(65) Prior Publication Data

US 2023/0344594 A1     Oct. 26, 2023

(30) Foreign Application Priority Data

Apr. 22, 2022     (KR) ........................ 10-2022-0050319

(51) Int. Cl.
*H04L 5/00* (2006.01)
(52) U.S. Cl.
CPC ................................ *H04L 5/0051* (2013.01)
(58) Field of Classification Search
CPC ............................ H04L 1/0051; H04L 1/0048
See application file for complete search history.

(56) References Cited

U.S. PATENT DOCUMENTS

| | | | |
|---|---|---|---|
| 2022/0029764 A1* | 1/2022 | Liou ...................... | H04L 5/0094 |
| 2022/0030544 A1* | 1/2022 | Zhou ................... | H04W 64/006 |
| 2023/0224934 A1* | 7/2023 | Manolakos ........... | H04W 72/51 |
| | | | 370/329 |
| 2023/0337239 A1* | 10/2023 | Lei ......................... | H04L 5/0051 |
| 2024/0015762 A1* | 1/2024 | Yerramalli .......... | H04W 72/232 |
| 2024/0196357 A1* | 6/2024 | Manolakos ........... | H04L 5/0051 |
| 2024/0267822 A1* | 8/2024 | Pan ...................... | H04W 36/322 |

OTHER PUBLICATIONS

Korean Intellectual Property Office Application No. 10-2022-0159145, Office Action dated Mar. 5, 2025, 4 pages.
Huawei et al., "Maintenance of RRC_Inactive state positioning," R1-2202421, 3GPP TSG-RAN WG1 Meeting #108-e, e-Meeting, Mar. 2022, 9 pages.
European Patent Office Application Serial No. 23167543.0, Search Report dated Sep. 18, 2023, 9 pages.
Moderator (Intel Corporation), "Feature Lead Summary#3 for E-mail Discussion [108-e-NR-ePos-06]," R1-2202525, 3GPP TSG RAN WG1 #108, e-Meeting, Mar. 2022, 56 pages.

(Continued)

*Primary Examiner* — Kent Krueger
(74) *Attorney, Agent, or Firm* — LEE, HONG, DEGERMAN, KANG & WAIMEY

(57) ABSTRACT

The embodiment relate to a next-generation wireless communication system for supporting a data transmission rate or the like higher than that of a 4th generation (4G) wireless communication system. According to the embodiment, provided are a method for transmitting and receiving a signal in a wireless communication system, and an apparatus supporting same, and various other embodiments can also be provided.

10 Claims, 26 Drawing Sheets

(56)                    References Cited

OTHER PUBLICATIONS

Qualcomm Incorporated, "On NR positioning measurements in RRC_Inactive," R4-2204465, 3GPP TSG-RAN WG4 Meeting #102-e, Online Meeting, Mar. 2022, 12 pages.

Korean Intellectual Property Office Application No. 10-2022-0159145, Notice of Allowance dated Nov. 7, 2025, 7 pages.

Qualcomm Incorporated, "Maintenance on enhancements Related to On Demand PRS And Positioning in RRC Inactive State", R1-2202145, 3GPP TSG RAN WG1 #108-e, Mar. 3, 2022, 10 pages.

* cited by examiner (a)

Device(100, 200)

METHOD FOR TRANSMITTING AND RECEIVING SIGNAL IN WIRELESS COMMUNICATION SYSTEM, AND APPARATUS FOR SUPPORTING SAME

CROSS-REFERENCE TO RELATED APPLICATIONS

Pursuant to 35 U.S.C. § 119 (a), this application claims the benefit of earlier filing date and right of priority to Korean Patent Application No. 10-2022-0050319, filed on Apr. 22, 2022, the contents of which are all hereby incorporated by reference herein in their entireties.

TECHNICAL FIELD

An embodiment is related to a wireless communication system.

BACKGROUND

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

SUMMARY

The embodiment may provide a method and apparatus for transmitting and receiving a signal in a wireless communication system.

The embodiment may provide a positioning method based on timing measurement and an apparatus supporting the same.

It will be appreciated by persons skilled in the art that the objects that could be achieved with the embodiment is not limited to what has been particularly described hereinabove and the above and other objects that the embodiment could achieve will be more clearly understood from the following detailed description.

The embodiment may provide a method and apparatus for transmitting and receiving a signal in a wireless communication system.

According to the embodiment, a method performed by a user equipment (UE) in a wireless communication system may be provided.

According to the embodiment, the method may include acquiring information about a first uplink (UL) bandwidth part (BWP).

According to the embodiment, the method may include acquiring information about a sounding reference signal (SRS) resource for transmission of an SRS for positioning in a radio resource control (RRC) inactive state.

According to the embodiment, the SRS resource may be included in a second UL BWP different from the first UL BWP.

According to the embodiment, the method may include transmitting the SRS in the RRC inactive state.

According to the embodiment, the SRS may be transmitted on the SRS resource, based on (i) a window related to BWP switching being configured in a time domain and (ii) the SRS being transmitted within the window.

According to the embodiment, the BWP switching may be allowed within the window.

According to the embodiment, the BWP switching from the first UL BWP to the second UL BWP may be performed prior to transmission of the SRS on the SRS resource, based on (i) the window related to the BWP switching being configured in the time domain and (ii) the SRS being transmitted within the window.

According to the embodiment, a start point of the window in the time domain may be identified based on a reference channel for configuring the window.

According to the embodiment, the method may further include receiving request information related to a request for the SRS, According to the embodiment, the SRS may be transmitted as a response to the request information.

According to the embodiment, the start point of the window may be (i) a start symbol of the channel, (ii) a last symbol of the channel, (iii) a start symbol of a slot or a frame nearest to the channel, or (iv) a time point after a time offset configured from the channel, based on the reference channel being a channel to which the request information is mapped, and may be configured as one unit among a symbol, a slot, a subframe, and a frame, related to the time offset.

According to the embodiment, the start point of the window may be (i) a start symbol of a paging occasion (PO), (ii) a last symbol of the PO, (iii) a start symbol of a slot or a frame nearest to the PO, or (iv) a time point after a time offset configured from the PO, based on the reference channel being the PO, and may be configured as one unit among a symbol, a slot, a subframe, and a frame, related to the time offset.

According to the embodiment, the PO may be a PO nearest to the channel to which the request information is mapped after the request information is received.

According to the embodiment, the start point of the window may be (i) a start symbol of a synchronization signal block (SSB), (ii) a last symbol of the SSB, (iii) a start symbol of a slot or a frame nearest to the SSB, or (iv) a time point after a time offset configured from the SSB, based on the reference channel being the SSB, and may be configured as one unit among a symbol, a slot, a subframe, and a frame, related to the time offset, and the SSB may be an SSB used for synchronization acquisition.

According to the embodiment, a user equipment (UE) configured to operate in a wireless communication system may be provided.

According to the embodiment, the UE may include a transceiver, and at least one processor coupled with the transceiver.

According to the embodiment, the at least one processor may be configured to acquire information about a first uplink (UL) bandwidth part (BWP).

According to the embodiment, the at least one processor may be configured to acquire information about a sounding reference signal (SRS) resource for transmission of an SRS for positioning in a radio resource control (RRC) inactive state.

According to the embodiment, SRS resource may be included in a second UL BWP different from the first UL BWP.

According to the embodiment, the at least one processor may be configured to transmit the SRS in the RRC inactive state.

According to the embodiment, the SRS may be transmitted on the SRS resource, based on (i) a window related to BWP switching being configured in a time domain and (ii) the SRS being transmitted within the window.

According to the embodiment, the at least one processor may be configured to communicate with at least one of a UE, a network, and an autonomous vehicle other than a vehicle in which the UE is included.

According to the embodiment, a method performed by a base station in a wireless communication system may be provided.

According to the embodiment, the method may include transmitting information about a first uplink (UL) bandwidth part (BWP).

According to the embodiment, the method may include transmitting information about a sounding reference signal (SRS) resource for reception of an SRS for positioning in a radio resource control (RRC) inactive state.

According to the embodiment, the SRS resource may be included in a second UL BWP different from the first UL BWP.

According to the embodiment, the method may include receiving the SRS in the RRC inactive state.

According to the embodiment, the SRS may be received on the SRS resource, based on (i) a window related to BWP switching being configured in a time domain and (ii) the SRS being received within the window.

According to the embodiment, a base station operating in a wireless communication system may be provided.

According to the embodiment, the base station may include a transceiver, and at least one processor coupled with the transceiver.

According to the embodiment, the at least one processor may be configured to transmit information about a first uplink (UL) bandwidth part (BWP).

According to the embodiment, the at least one processor may be configured to transmit information about a sounding reference signal (SRS) resource for reception of an SRS for positioning in a radio resource control (RRC) inactive state.

According to the embodiment, the SRS resource may be included in a second UL BWP different from the first UL BWP.

According to the embodiment, the at least one processor may be configured to receive the SRS in the RRC inactive state.

According to the embodiment, the SRS maybe received on the SRS resource, based on (i) a window related to BWP switching being configured in a time domain and (ii) the SRS being received within the window.

According to the embodiment, an apparatus operating in a wireless communication system may be provided.

According to the embodiment, the apparatus may include at least one processor, and at least one memory storing at least one instruction to cause the at least one processor to perform operations.

According to the embodiment, the operations may include acquiring information about a first uplink (UL) bandwidth part (BWP).

According to the embodiment, the operations may include acquiring information about a sounding reference signal (SRS) resource for transmission of an SRS for positioning in a radio resource control (RRC) inactive state.

According to the embodiment, the SRS resource may be included in a second UL BWP different from the first UL BWP.

According to the embodiment, the operations may include transmitting the SRS in the RRC inactive state.

According to the embodiment, the SRS may be transmitted on the SRS resource, based on (i) a window related to BWP switching being configured in a time domain and (ii) the SRS being transmitted within the window.

According to the embodiment, a non-transitory processor-readable medium storing at least one instruction to cause at least one processor to perform operations may be provided.

According to the embodiment, the operations may include acquiring information about a first uplink (UL) bandwidth part (BWP).

According to the embodiment, the operations may include acquiring information about a sounding reference signal (SRS) resource for transmission of an SRS for positioning in a radio resource control (RRC) inactive state.

According to the embodiment, the SRS resource may be included in a second UL BWP different from the first UL BWP.

According to the embodiment, the operations may include transmitting the SRS in the RRC inactive state.

According to the embodiment, the SRS may be transmitted on the SRS resource, based on (i) a window related to BWP switching being configured in a time domain and (ii) the SRS being transmitted within the window.

It will be appreciated by persons skilled in the art that the effects that can be achieved with the embodiment is not limited to what has been particularly described hereinabove and other advantages of the embodiment will be more clearly understood from the following detailed description taken in conjunction with the accompanying drawings.

According to the embodiment, a signal may be effectively transmitted and received in a wireless communication system.

According to the embodiment, positioning may be effectively performed in a wireless communication system.

According to the embodiment, positioning for a UE of an RRC inactive state may be effectively performed.

It will be appreciated by persons skilled in the art that the effects that can be achieved with the embodiment is not limited to what has been particularly described hereinabove and other advantages of the embodiment will be more clearly understood from the following detailed description taken in conjunction with the accompanying drawings.

BRIEF DESCRIPTION OF DRAWINGS

The accompanying drawings are provided to help understanding of the embodiment, along with a detailed description. However, the technical features of the embodiment is not limited to a specific drawing, and features disclosed in each drawing may be combined with each other to constitute a new embodiment. Reference numerals in each drawing denote structural elements.

5

E-UTRAN/EPC (Evolved-Universal Terrestrial Radio Access Network/Evolved Packet Core) according to the embodiment.

Figure 6:
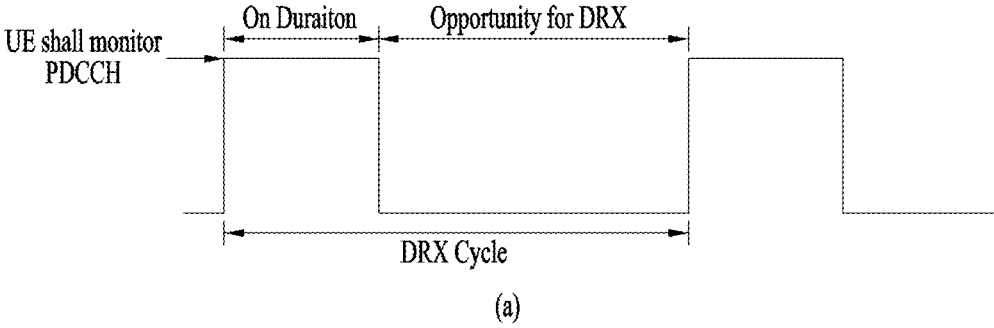
Figure 6:
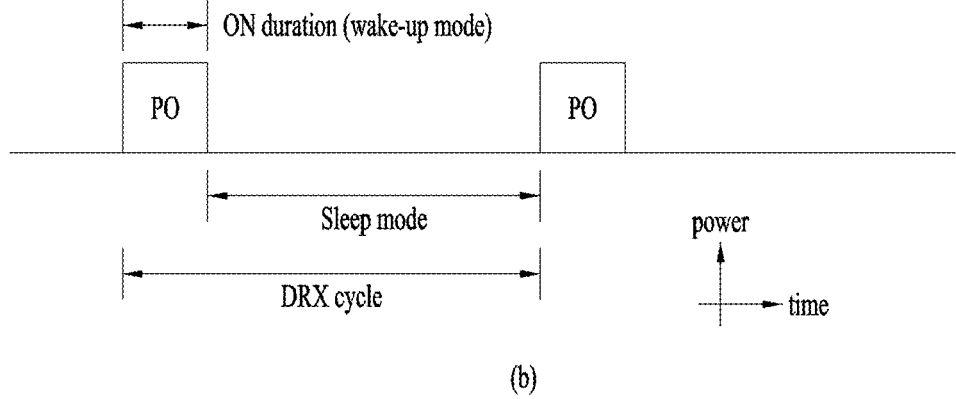

FIG. 6 is a diagram illustrating an exemplary discontinuous reception (DRX) operation according to the embodiment.

Figure 7:
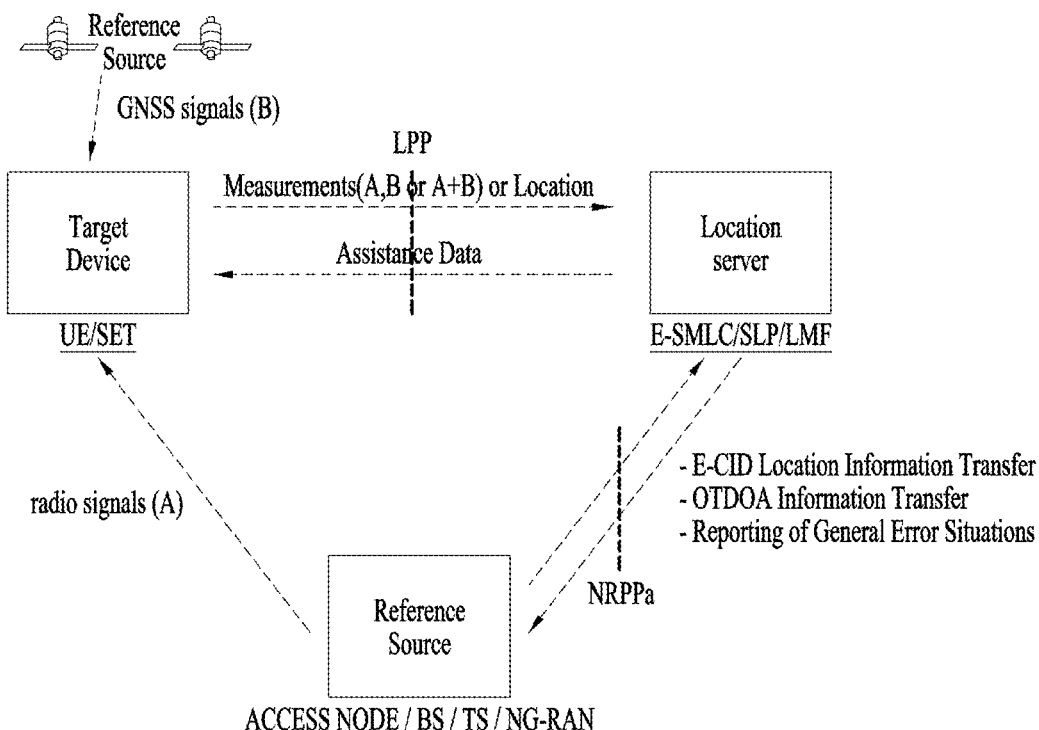

FIG. 7 is a diagram illustrating an exemplary positioning protocol configuration for user equipment (UE) positioning, which is applicable to the embodiment.

Figure 8:
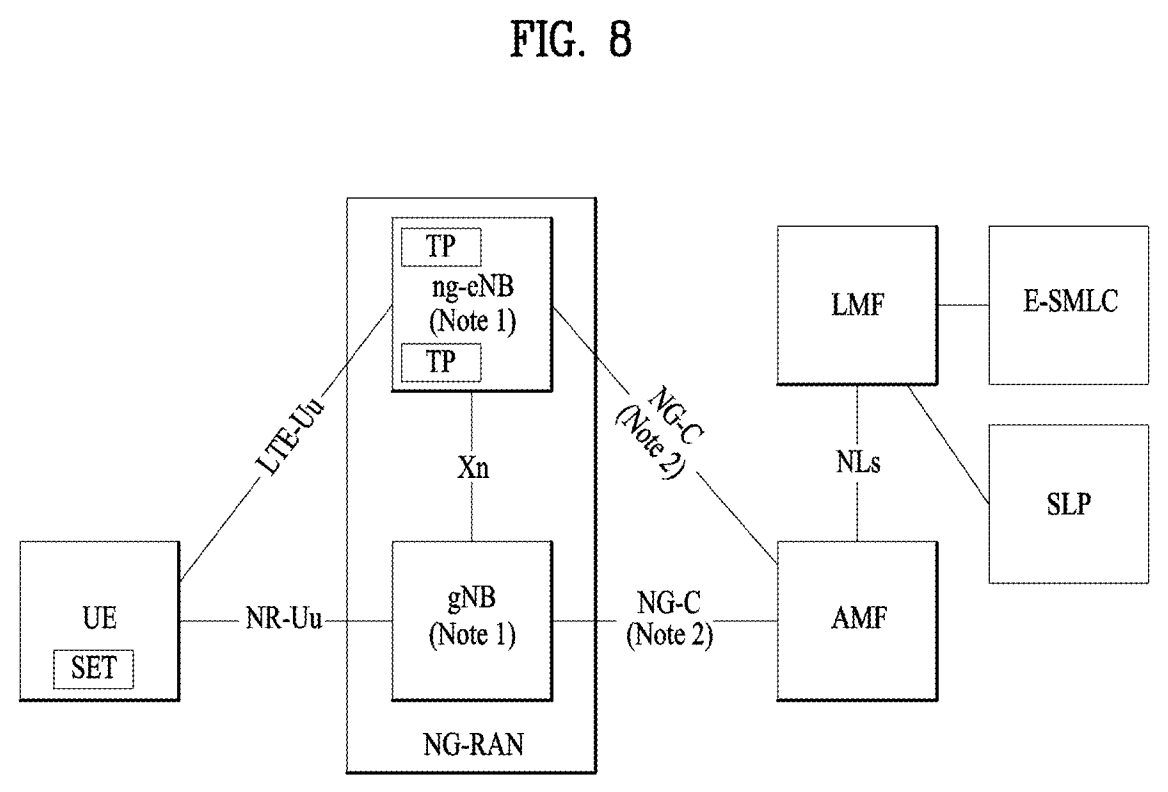

FIG. 8 is a diagram illustrating an example of an architecture of a system for positioning a UE, to which the embodiment is applicable.

Figure 9:
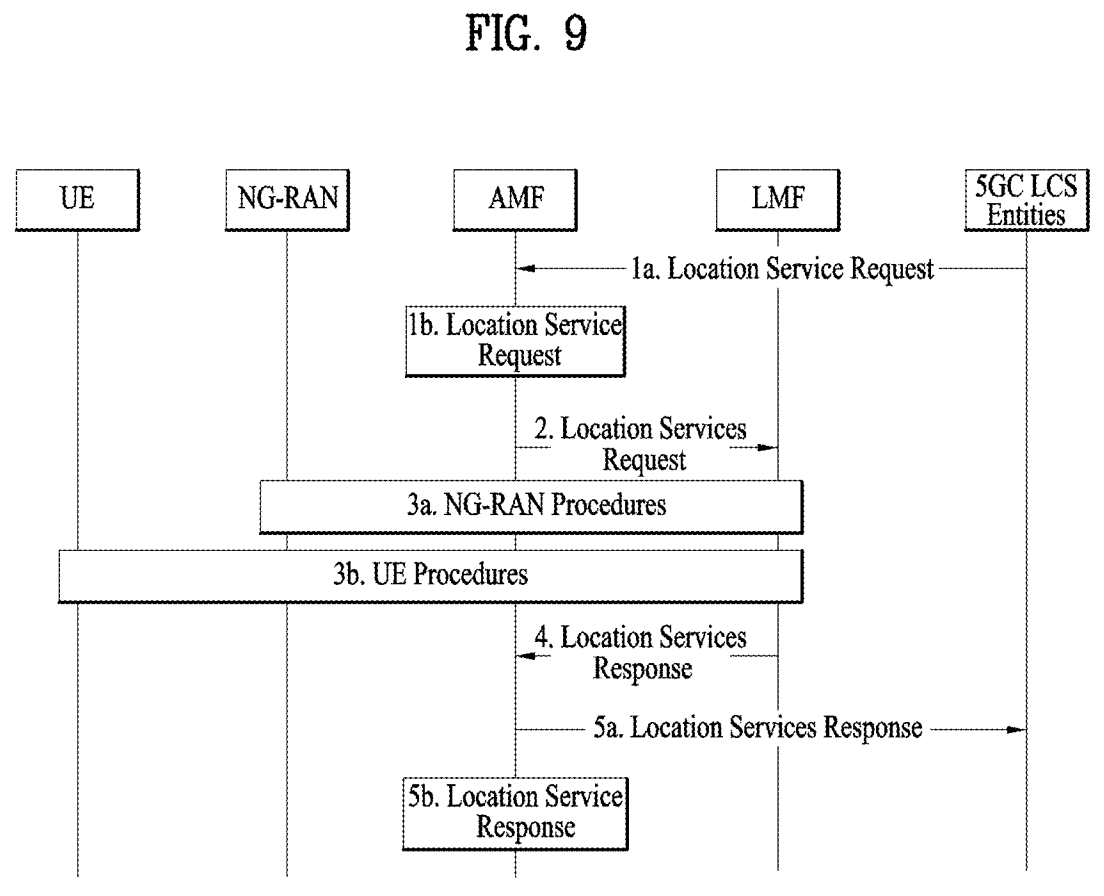

FIG. 9 is a diagram illustrating an example of a procedure of positioning a UE, to which the embodiment is applicable.

Figure 10:
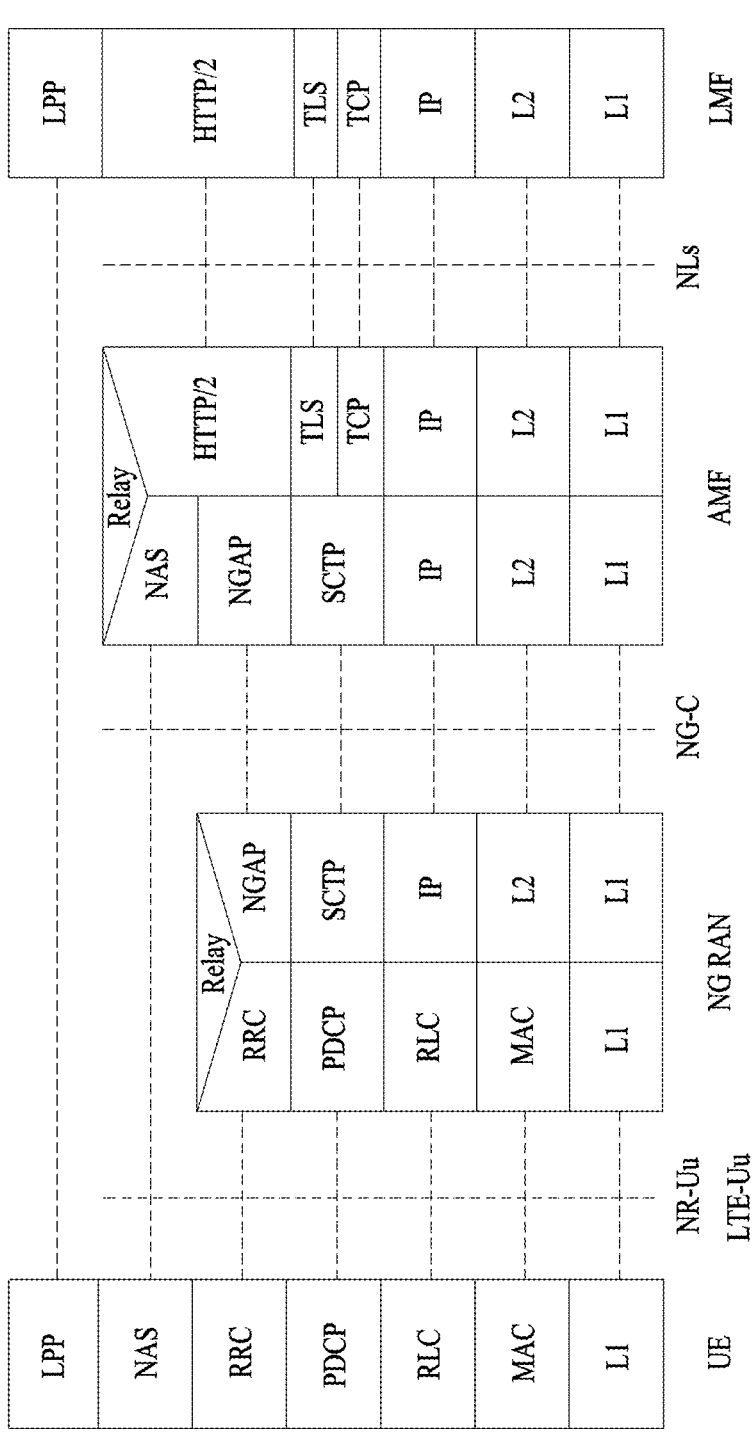

FIG. 10 is a diagram illustrating protocol layers for supporting LTE positioning protocol (LPP) message transmission, to which the embodiment is applicable.

Figure 11:
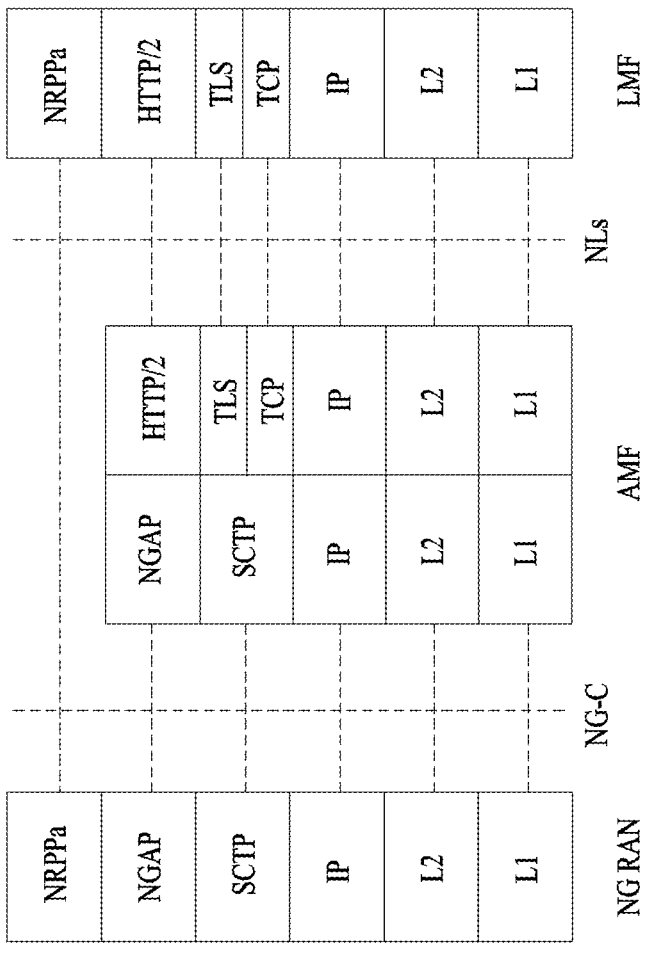

FIG. 11 is a diagram illustrating protocol layers for supporting NR positioning protocol A (NRPPa) protocol data unit (PDU) transmission, to which the embodiment is applicable.

Figure 12:
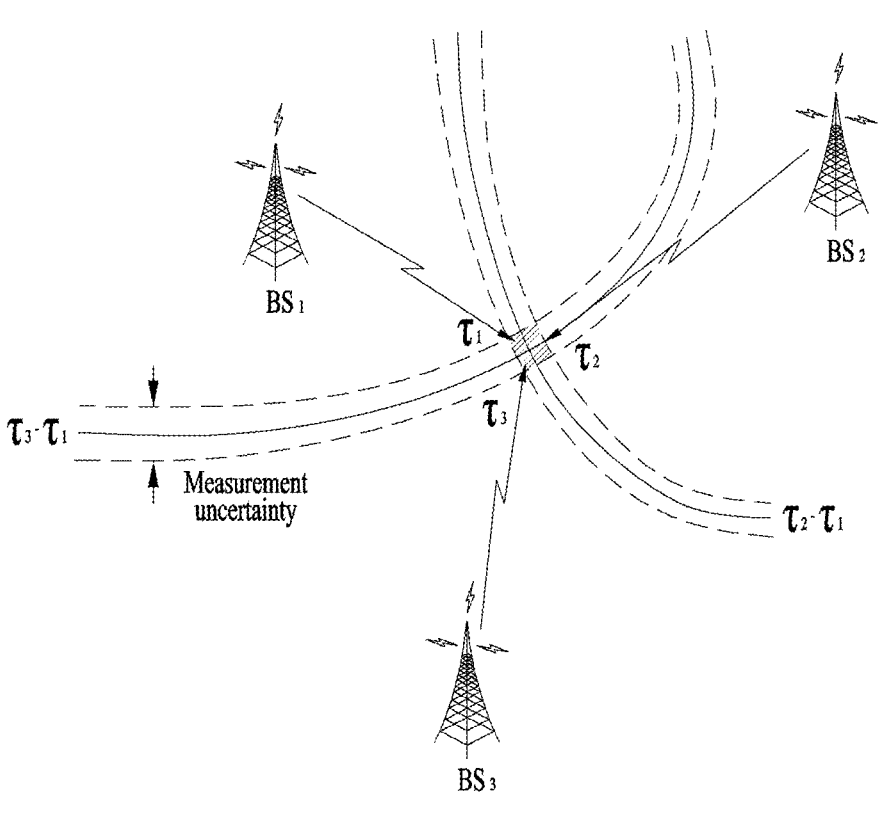

FIG. 12 is a diagram illustrating an observed time difference of arrival (OTDOA) positioning method, to which the embodiment is applicable.

Figure 13:
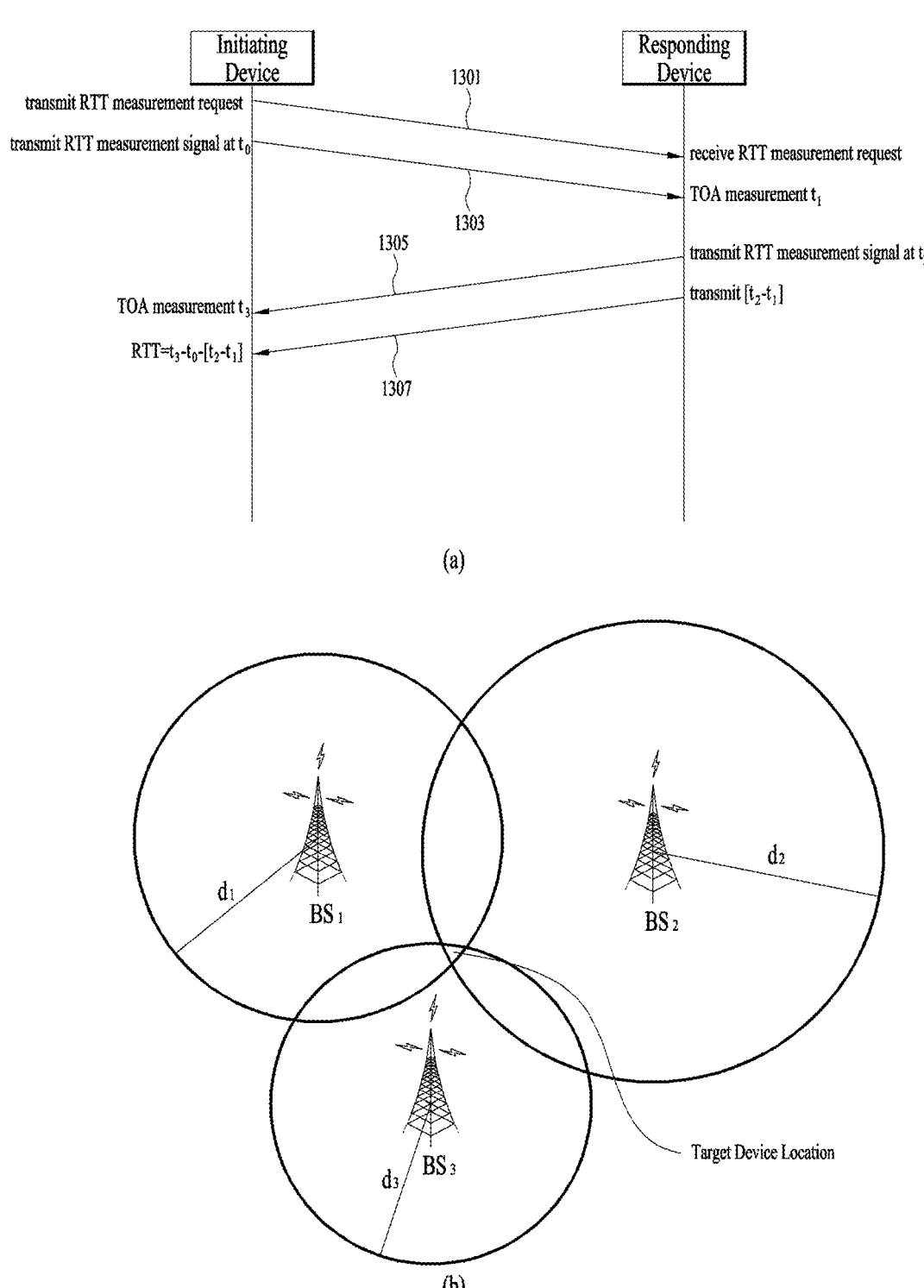

FIG. 13 is a diagram illustrating a multi-round trip time (multi-RTT) positioning method to which the embodiment is applicable.

Figure 14:
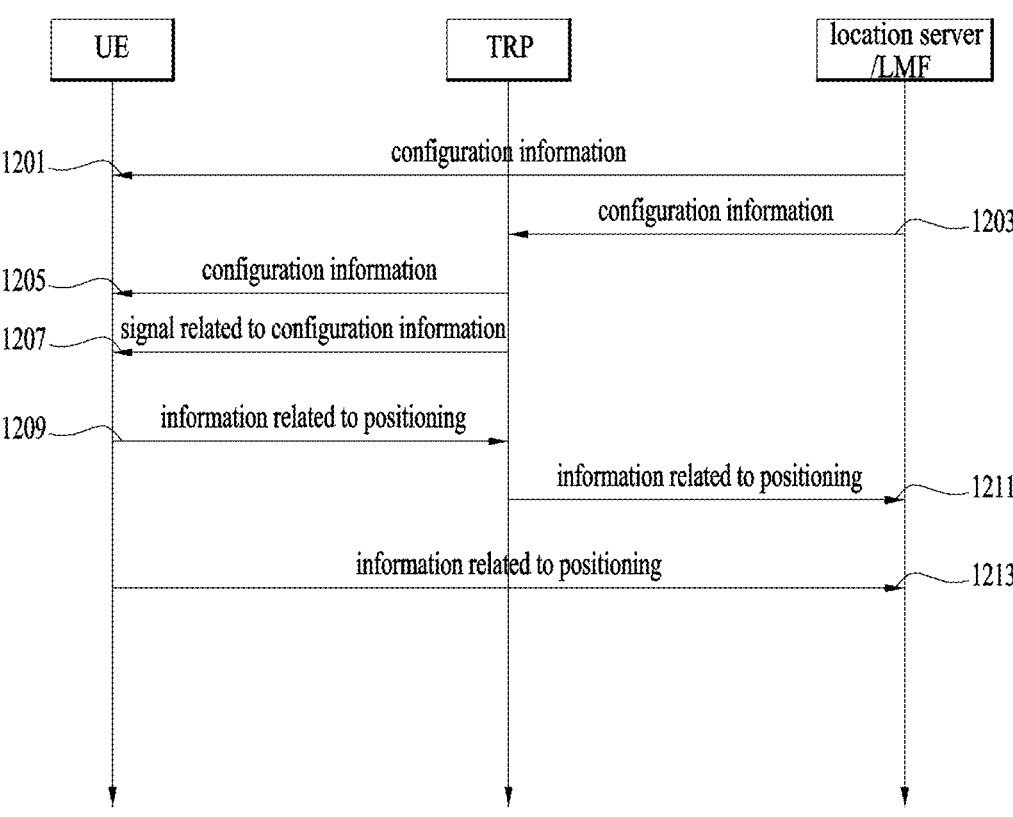

FIG. 14 is a simplified diagram illustrating a method of operating a UE, a transmission and reception point (TRP), a location server, and/or a location management function (LMF) according to the embodiment.

Figure 15:
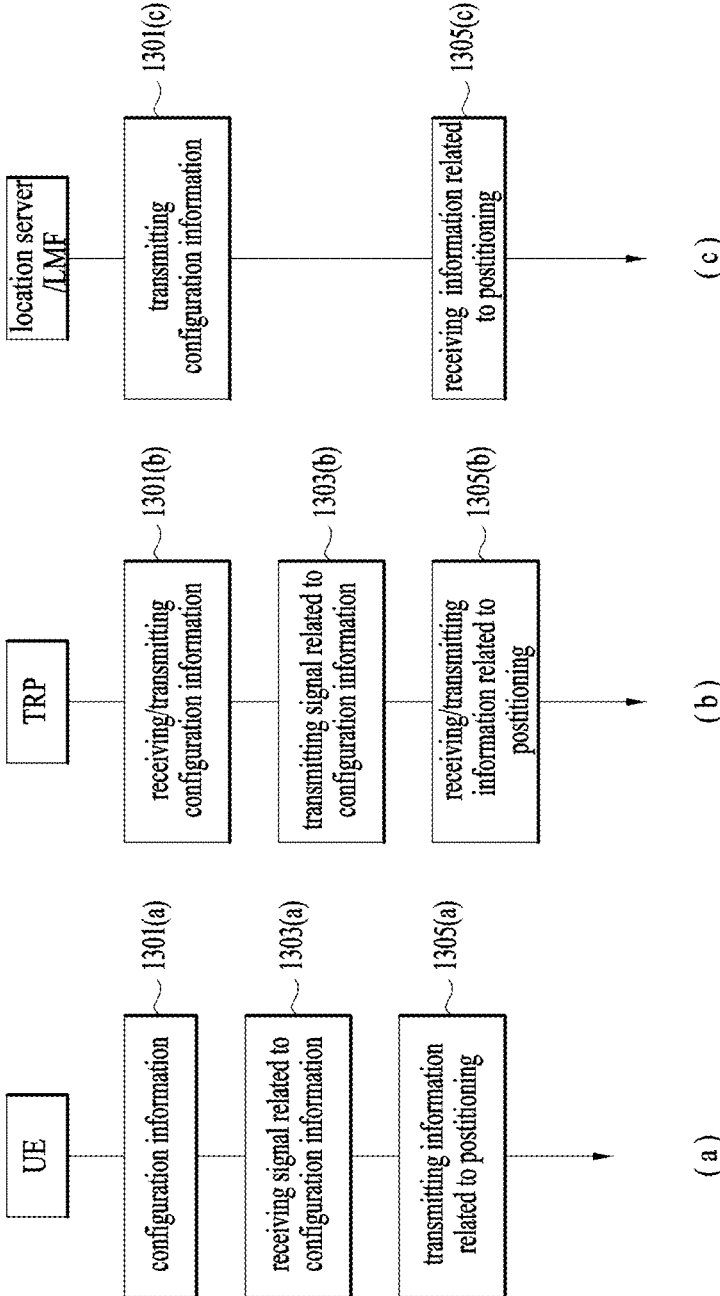

FIG. 15 is a simplified diagram illustrating a method of operating a UE, a TRP, a location server, and/or an LMF according to the embodiment.

Figure 16:
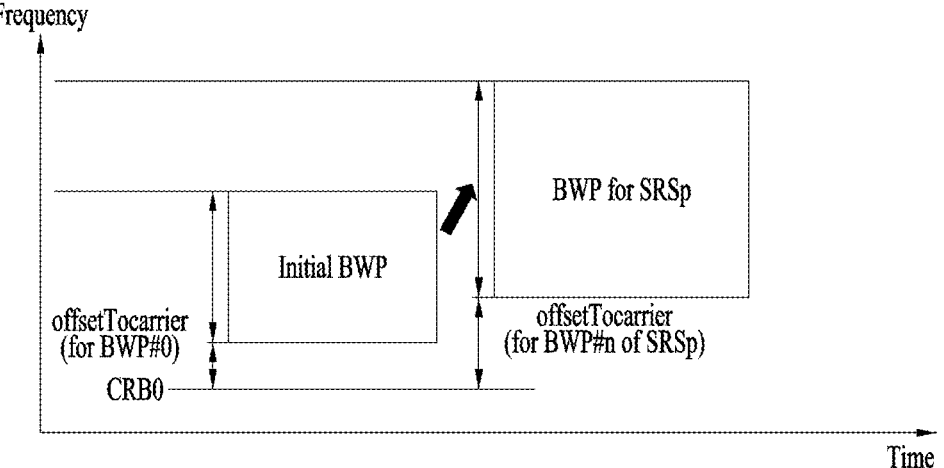

FIG. 16 illustrates an example of configuring a bandwidth part (BWP) for a sounding reference signal (SRS) for positioning (SRSp) to which the embodiment is applicable.

Figure 17:
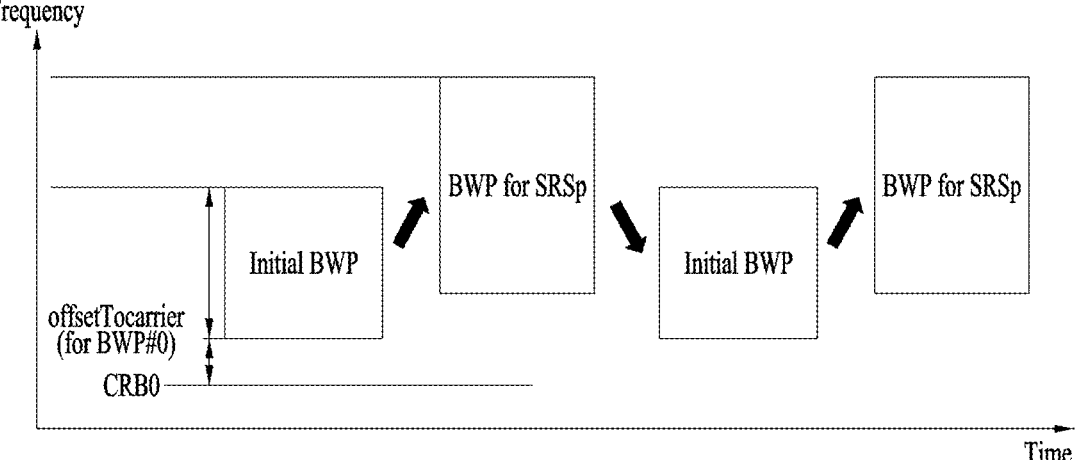

FIG. 17 illustrates an example of BWP switching for an SRSp to which the embodiment is applicable.

Figure 18:
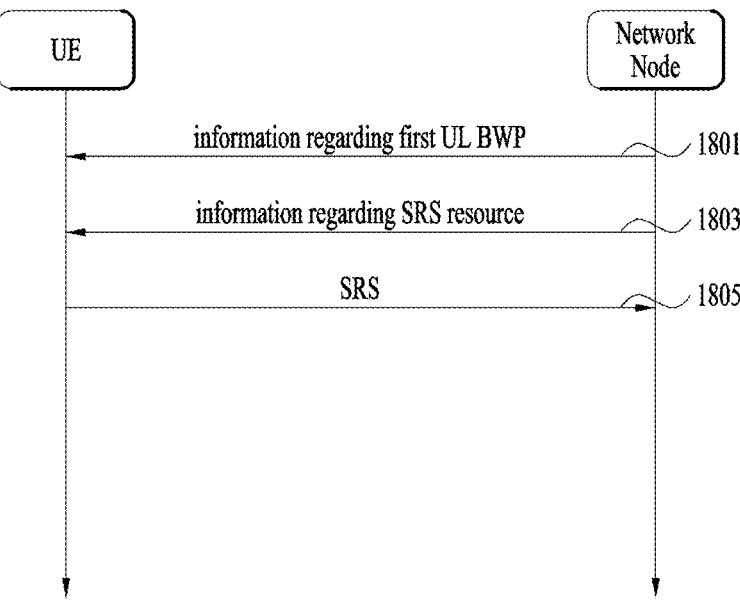

FIG. 18 is a diagram schematically illustrating an operation method of a UE and a network node according to the embodiment.

Figure 19:
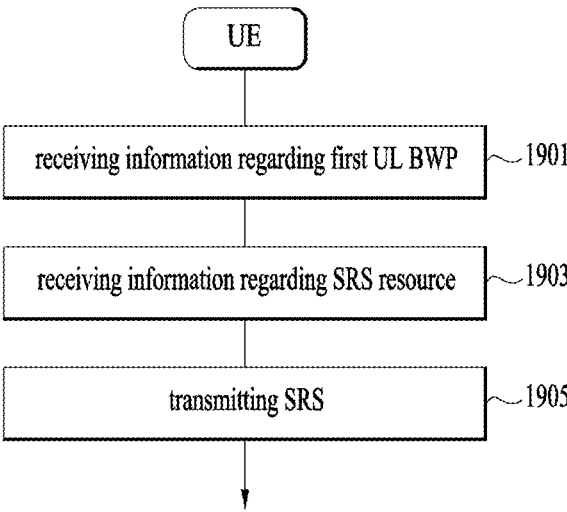

FIG. 19 is a flowchart illustrating an operating method of a UE according to the embodiment.

Figure 20:
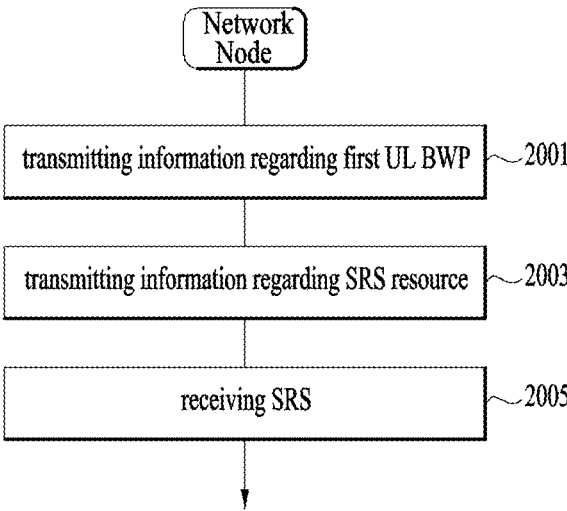

FIG. 20 is a flowchart illustrating an operating method of a network node according to the embodiment.

Figure 21:
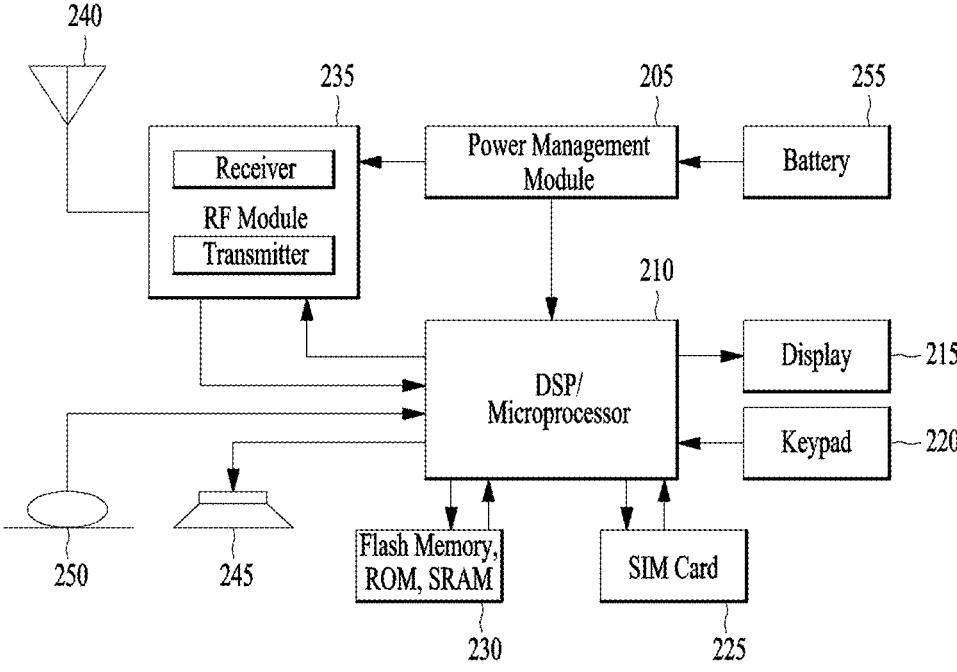

FIG. 21 is a block diagram illustrating an apparatus for implementing the embodiment.

Figure 22:
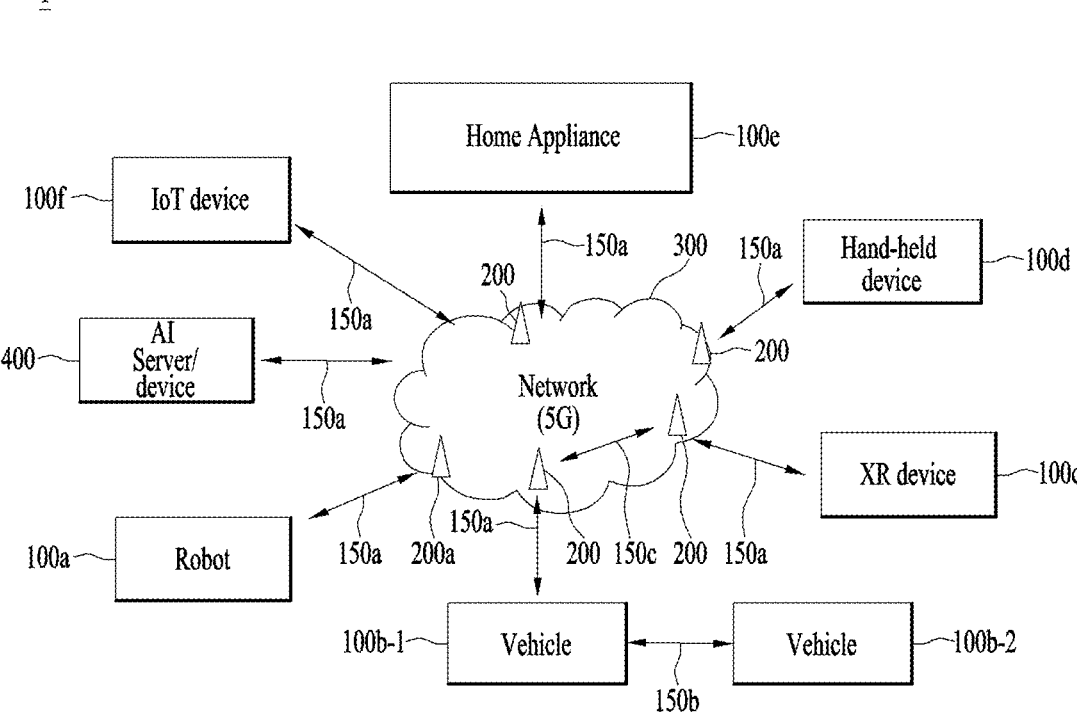

FIG. 22 is a diagram illustrating a communication system to which the embodiment is applicable.

Figure 23:
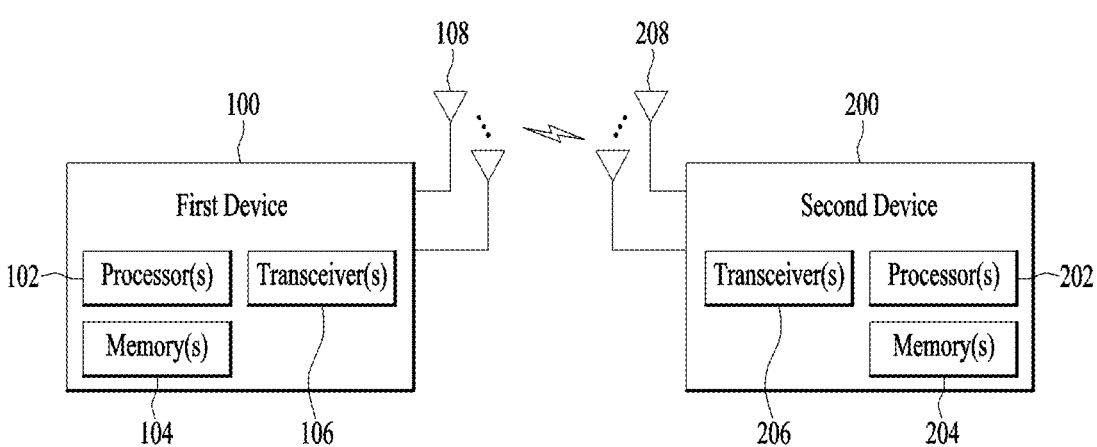

FIG. 23 is a block diagram illustrating wireless devices to which the embodiment is applicable.

Figure 24:
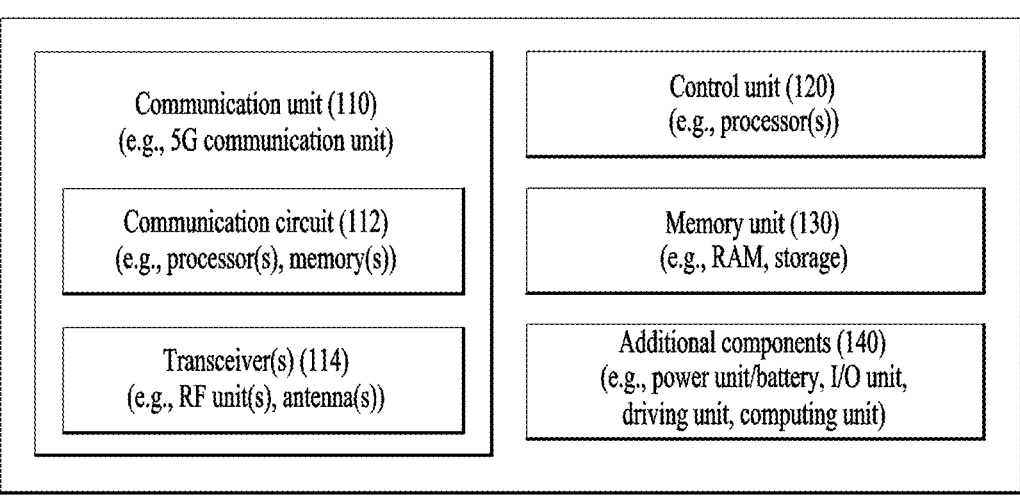

FIG. 24 is a block diagram illustrating another example of wireless devices to which the embodiment is applicable.

Figure 25:
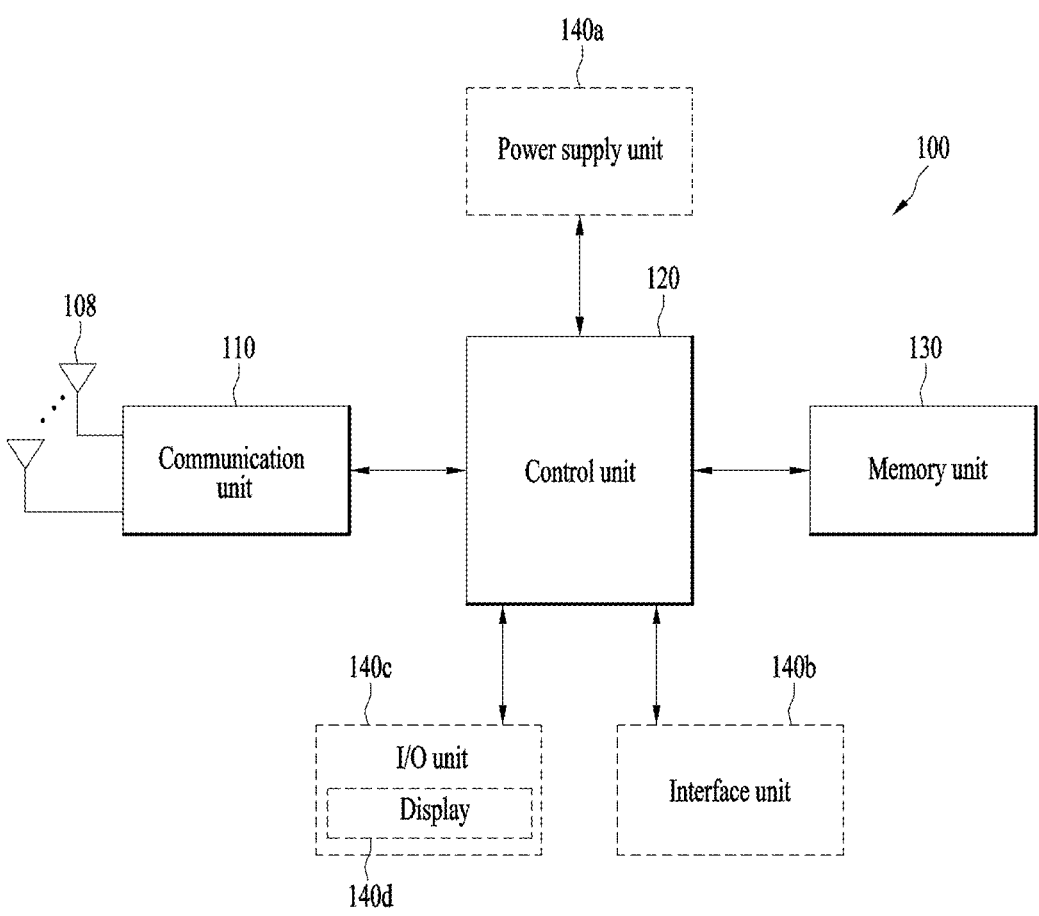

FIG. 25 is a block diagram illustrating a portable device applied to the embodiment.

Figure 26:
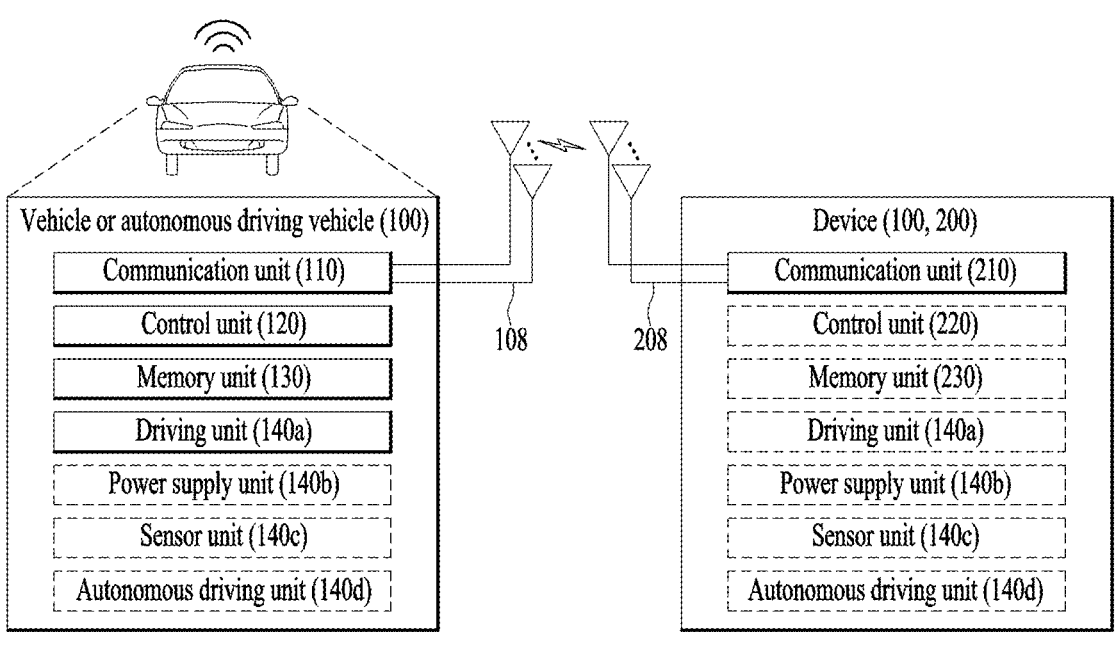

FIG. 26 is a block diagram illustrating a vehicle or an autonomous driving vehicle, which is applied to the embodiment.

DETAILED DESCRIPTION

The embodiment is applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

The embodiment is described in the context of a 3GPP communication system (e.g., including LTE, NR, 6G, and next-generation wireless communication systems) for clarity of description, to which the technical spirit of the embodiment is not limited. For the background art, terms, and abbreviations used in the description of the embodiment, refer to the technical specifications published before the present disclosure. For example, the documents of 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 37.455, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, 3GPP TS 38.355, 3GPP TS 38.455, and so on may be referred to.

1. 3GPP System

1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
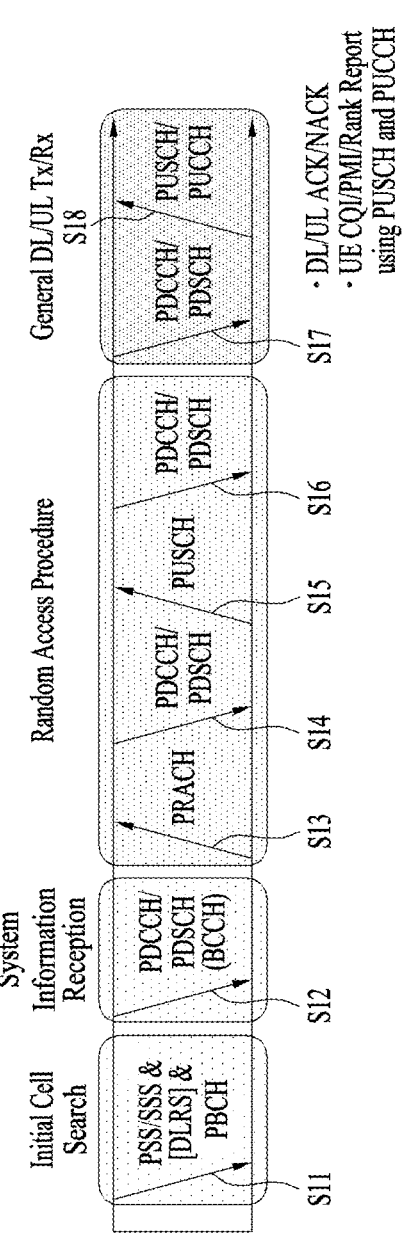
FIG. 1 is a diagram illustrating physical channels and a signal transmission method using the physical channels, which may be used in the embodiment.

FIG. 1 is a diagram illustrating physical channels and a signal transmission method using the physical channels, which may be used in the embodiment.

When powered on or when a UE initially enters a cell, the UE performs initial cell search involving synchronization with a BS in step S11. For initial cell search, the UE receives a synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S12.

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a physical uplink shared channel (PUSCH) by using scheduling information in the RAR (S15), and perform a contention resolution procedure including reception of a PDCCH signal and a PDSCH signal corresponding to the PDCCH signal (S16).

Aside from the above 4-step random access procedure (4-step RACH procedure or type-1 random access procedure), when the random access procedure is performed in two steps (2-step RACH procedure or type-2 random access procedure), steps S13 and S15 may be performed as one UE transmission operation (e.g., an operation of transmitting message A (MsgA) including a PRACH preamble and/or a PUSCH), and steps S14 and S16 may be performed as one BS transmission operation (e.g., an operation of transmitting message B (MsgB) including an RAR and/or contention resolution information)

After the above procedure, the UE may receive a PDCCH and/or a PDSCH from the BS (S17) and transmit a PUSCH and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Physical Resource

Figure 2:
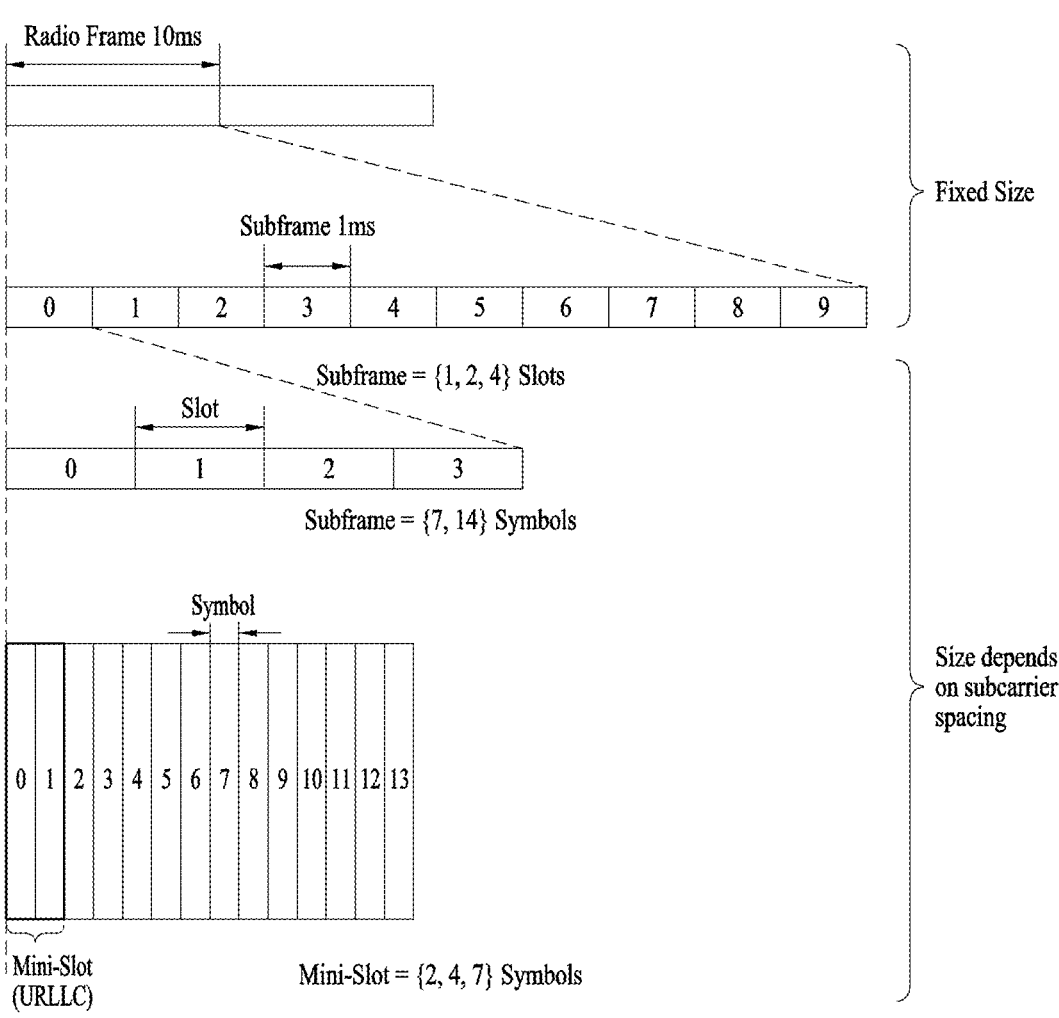
FIG. 2 is a diagram illustrating a radio frame structure in a new radio access technology (NR) system to which the embodiment is applicable.

FIG. 2 is a diagram illustrating a radio frame structure in a new radio access technology (NR) system to which the embodiment is applicable.

The NR system may support multiple numerologies. A numerology may be defined by a subcarrier spacing (SCS) and a cyclic prefix (CP) overhead. Multiple SCSs may be derived by scaling a default SCS by an integer N (or u). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part, u and a CP are obtained from RRC parameters provided by the BS.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c = 1/(\Delta f_{max} * N_f)$ where $\Delta f_{max} = 480*103$ Hz and a value Nr related to a fast Fourier transform (FFT) size or an inverse fast Fourier transform (IFFT) size is given as $N_f = 4096$. Tc and Ts which is an LTE-based time unit and sampling time, given as Ts=1/((15 kHz)*2048) are placed in the following relationship: Ts/Tc=64. DL and UL transmissions are organized into (radio) frames each having a duration of $T_f = (\Delta f_{max} * N_f/100) * T_c = 10$ ms. Each radio frame includes 10 subframes each having a duration of $T_{sf} = (\Delta f_{max} * No/1000) * T_c = 1$ ms. There may exist one set of frames for UL and one set of frames for DL. For a numerology $\mu$, slots are numbered with $n^\mu_s \in \{0, \ldots, N^{slot,\mu}_{subframe}-1\}$ in an increasing order in a subframe, and with $n^\mu_{s,f} \in \{0, \ldots, N^{slot,\mu}_{frame}-1\}$ in an increasing order in a radio frame. One slot includes $N^\mu_{symb}$ consecutive OFDM symbols, and $N^\mu_{symb}$ depends on a CP. The start of a slot $n^\mu_s$ in a subframe is aligned in time with the start of an OFDM symbol $n^\mu_s * N^\mu_{symb}$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which the embodiment is applicable, different OFDM (A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 6, one subframe may include four slots. One subframe={1, 2, 4} slots in FIG. 7, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Regarding physical resources in the NR system, antenna ports, a resource grid, resource elements (REs), resource blocks (RBs), carrier parts, and so one may be considered. The physical resources in the NR system will be described below in detail.

An antenna port is defined such that a channel conveying a symbol on an antenna port may be inferred from a channel conveying another symbol on the same antenna port. When the large-scale properties of a channel carrying a symbol on one antenna port may be inferred from a channel carrying a symbol on another antenna port, the two antenna ports may be said to be in a quasi co-located or quasi co-location (QCL) relationship. The large-scale properties include one or more of delay spread, Doppler spread, frequency shift, average received power, received timing, average delay, and a spatial reception (Rx) parameter. The spatial Rx parameter refers to a spatial (Rx) channel property parameter such as an angle of arrival.

Figure 3:
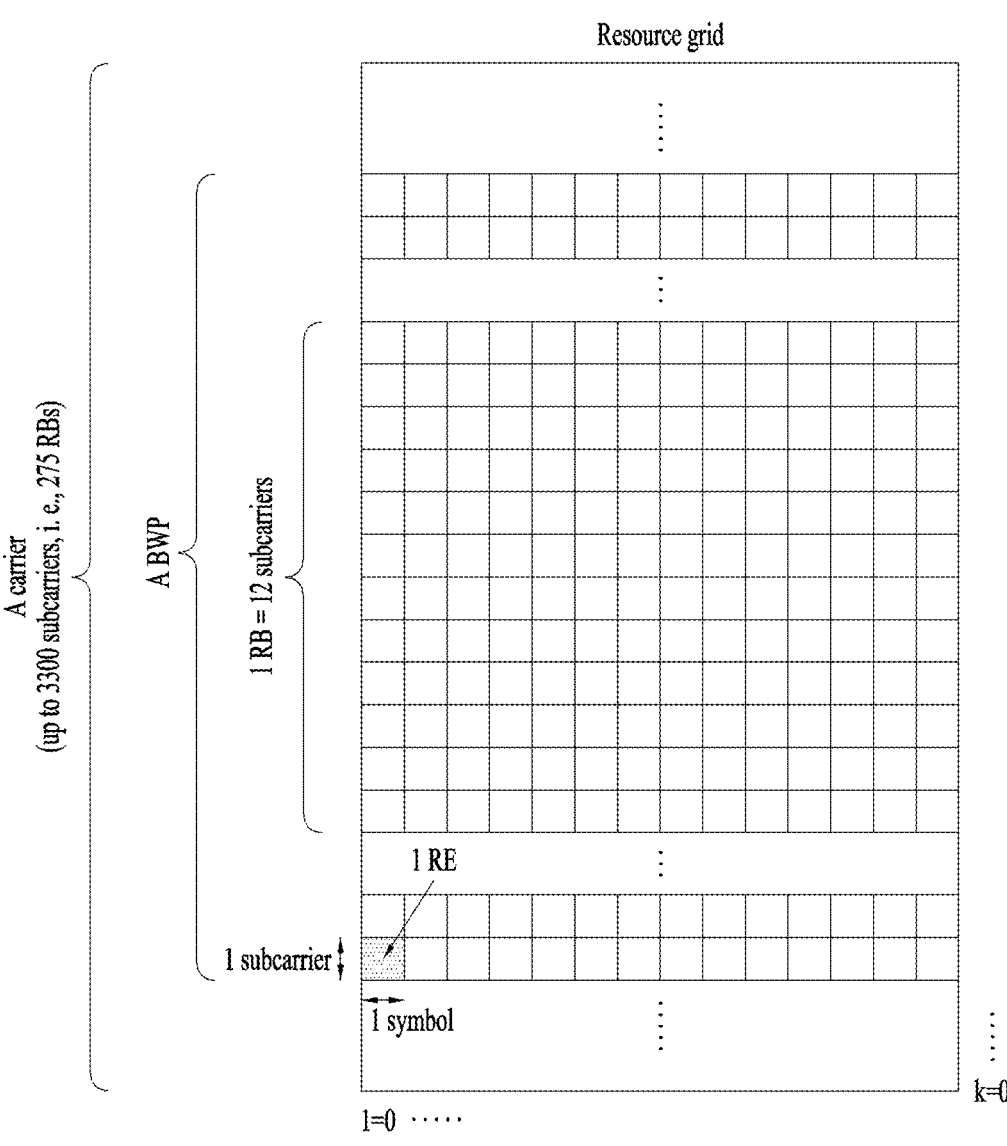
FIG. 3 is a diagram illustrating mapping of physical channels in a slot, to which the embodiment is applicable.

FIG. 3 illustrates an exemplary resource grid to which the embodiment is applicable.

Referring to FIG. 3, for each subcarrier spacing (SCS) and carrier, a resource grid is defined as 14×2μ OFDM symbols by $$N_{grid}^{size,\mu} \times N_{SC}^{RB}$$

subcarriers, where $$N_{grid}^{size,\mu}$$

is indicated by RRC signaling from the BS.

$$N_{grid}^{size,\mu}$$

may vary according to an SCS configuration u and a transmission direction, UL or DL. There is one resource grid for an SCS configuration u, an antenna port p, and a transmission direction (UL or DL). Each element of the resource grid for the SCS configuration u and the antenna port p is referred to as an RE and uniquely identified by an index pair (k,l) where k represents an index in the frequency domain, and l represents a symbol position in the frequency domain relative to a reference point. The RE (k,l) for the SCS configuration μ and the antenna port p corresponds to a physical resource and a complex value $$a_{k,l}^{(p,\mu)}.$$

An RB is defined as $$N_{SC}^{RB} = 12$$

consecutive subcarriers in the frequency domain.

Considering that the UE may not be capable of supporting a wide bandwidth supported in the NR system, the UE may be configured to operate in a part (bandwidth part (BWP)) of the frequency bandwidth of a cell.

Figure 4:
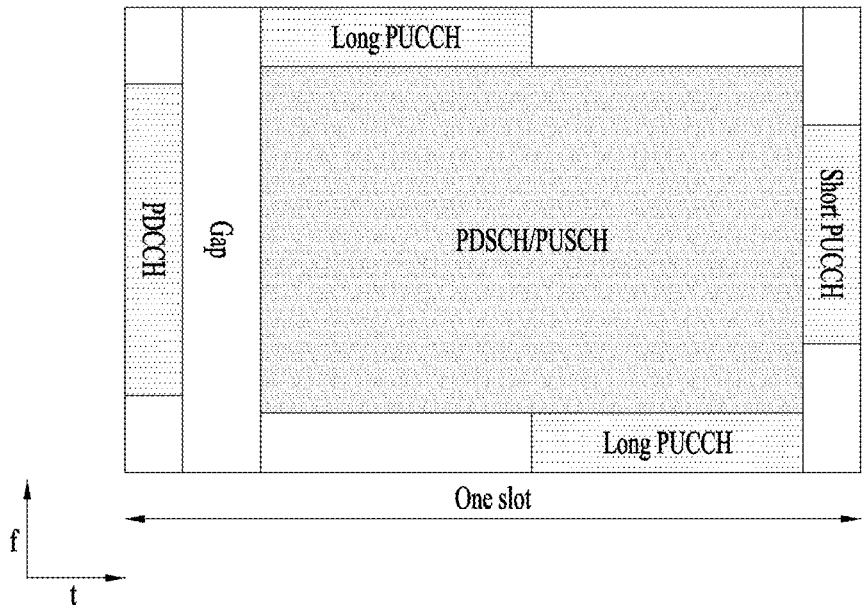
FIG. 4 is a diagram illustrating mapping of physical channels in a slot, to which the embodiment is applicable.

FIG. 4 is a diagram illustrating exemplary mapping of physical channels in a slot, to which the embodiment is applicable.

One slot may include all of a DL control channel, DL or UL data, and a UL control channel. For example, the first N symbols of a slot may be used to transmit a DL control channel (hereinafter, referred to as a DL control region), and the last M symbols of the slot may be used to transmit a UL control channel (hereinafter, referred to as a UL control region). Each of N and M is an integer equal to or larger than 0. A resource area (hereinafter, referred to as a data region) between the DL control region and the UL control region may be used to transmit DL data or UL data. There may be a time gap for DL-to-UL or UL-to-DL switching between a control region and a data region. A PDCCH may be transmitted in the DL control region, and a PDSCH may be transmitted in the DL data region. Some symbols at a DL-to-UL switching time in the slot may be used as the time gap.

The BS transmits related signals to the UE on DL channels as described below, and the UE receives the related signals from the BS on the DL channels.

The PDSCH conveys DL data (e.g., DL-shared channel transport block (DL-SCH TB)) and uses a modulation scheme such as quadrature phase shift keying (QPSK), 16-ary quadrature amplitude modulation (16 QAM), 64 QAM, or 256 QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/

NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P) RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling.

The UE transmits related signals on later-described UL channels to the BS, and the BS receives the related signals on the UL channels from the UE.

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH.

RRC (Radio Resource Control) State

Figure 5:
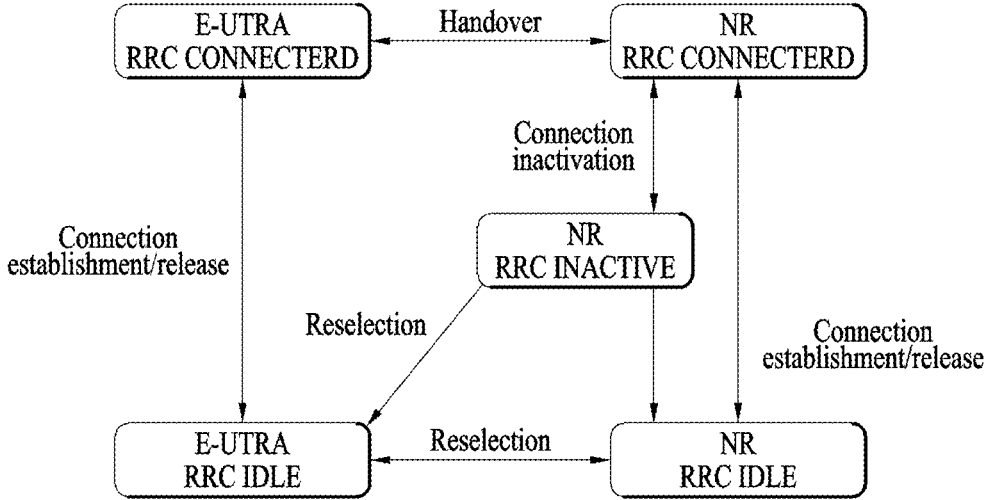
FIG. 5 is a diagram illustrating an RRC state of the UE, RRC state transition, and a mobility procedure supported between NR/NGC (NR/Next Generation Core)

FIG. 5 is a diagram illustrating an RRC state of the UE, RRC state transition, and a mobility procedure supported between NR/NGC (NR/Next Generation Core) and E-UTRAN/EPC (Evolved-Universal Terrestrial Radio Access Network/Evolved Packet Core) according to the embodiment.

A UE has only one RRC state in a specific time point. The RRC state may indicate whether the RRC layer of the UE was logically connected to an NG RAN (Radio Access Network) layer. When the RRC connection is established, the UE is in an RRC_CONNECTED or RRC_INACTIVE state. Alternatively, when the RRC connection is not established, the UE is in the RRC_idle state.

When the UE is in RRC_CONNECTED or RRC_INACTIVE state, the UE has RRC connection, so that the NG RAN may recognize the presence of the UE for each cell. On the other hand, when the UE is in RRC_IDLE state, the UE cannot be recognized by the NG RAN, and the UE is managed by a core network for each tracking area unit that is larger in size than the cell.

When an initial user powers on the UE, the UE may search for an appropriate cell, and may maintain the RRC_IDLE state in the corresponding cell. If only the RRC connection needs to be established, the UE in the RRC_IDLE state may establish RRC connection with the NG RAN through the RRC connection procedure, and may transition to the RRC_CONNECTED or RRC_INACTIVE state.

RRC states of the UE may have the following characteristics.

(1) RRC_IDLE State

Discontinuous reception (DRX) is established in the UE by higher layer signaling.

UE mobility is controlled based on network configuration.

UE monitors a paging channel.

UE performs neighbor cell measurement and cell (re) selection.

UE obtains system information.

(2) RRC_INACTIVE State

Discontinuous reception (DRX) is established in the UE by higher layer signaling or by RRC layer signaling.

UE mobility is controlled based on network configuration.

UE stores an Access Stratum (AS) context

UE monitors a paging channel.

UE performs neighbor cell measurement and cell (re) selection.

When the UE moves out of a RAN-based notification area, the UE updates the RAN-based notification area.

UE obtains system information.

(3) RRC_CONNECTED State

UE stores the AS context.

UE transmits and receives unicast data.

In a lower layer, a UE-specific DRX may be configured in the UE.

For increased bandwidth, a UE supporting carrier aggregation (CA) may use at least one SCell combined with a specific cell (SpCell).

For increased bandwidth, a UE supporting dual connectivity (DC) may use a secondary cell group (SCG) combined with a master cell group (MCG).

UE monitors a paging channel.

When data is scheduled for the UE, the UE monitors control channels related to a shared data channel.

UE provides channel quality and feedback information.

UE performs neighbor cell measurement and cell (re) selection.

UE obtains system information.

DRX (Discontinuous Reception)

FIG. 6 is an exemplary DRX operation according to the embodiment.

According to the embodiment, the UE may perform a DRX operation in the afore-described/proposed procedures and/or methods. When the UE is configured with DRX, the UE may reduce power consumption by receiving a DL signal discontinuously. DRX may be performed in an RRC_IDLE state, an RRC_INACTIVE state, and an RRC_CONNECTED state. In the RRC_IDLE state and the RRC_INACTIVE state, DRX is used to receive a paging signal discontinuously.

RRC_CONNECTED DRX

In the RRC_CONNECTED state, DRX is used to receive a PDCCH discontinuously. DRX in the RRC_CONNECTED state is referred to as RRC_CONNECTED DRX).

Referring to FIG. 6(a), a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, the UE may perform PDCCH monitoring/reception discontinuously in the time domain in the afore-described procedures and/or methods. For example, when DRX is configured, PDCCH reception occasions (e.g., slots with PDCCH search spaces) may be configured discontinuously according to a DRX configuration in the present disclosure. On the contrary, when DRX is not configured, the UE may perform PDCCH monitoring/reception continuously in the time domain in the afore-described procedures and/or methods according to implementation(s). For example, when DRX is not configured, PDCCH reception occasions (e.g., slots with PDCCH search spaces) may be configured continuously in the present disclosure. Irrespective of whether DRX is configured, PDCCH monitoring may be restricted during a time period configured as a measurement gap.

Table 5 describes a DRX operation of a UE (in the RRC_CONNECTED state). Referring to Table 5, DRX configuration information is received by higher-layer signaling (e.g., RRC signaling), and DRX ON/OFF is controlled by a DRX command from the MAC layer. Once DRX is configured, the UE may perform PDCCH monitoring discontinuously the afore-described procedures and/or methods according to the embodiment.

TABLE 5

| | Type of signals | UE procedure |
|---|---|---|
| 1ˢᵗ step | RRC signalling (MAC-CellGroupConfig) | Receive DRX configuration information |
| 2ⁿᵈ Step | MAC CE ((Long) DRX command MAC CE) | Receive DRX command |
| 3ʳᵈ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected.

Value of drx-HARQ-RTT-TimerDL: defines the duration of a maximum time period until a DL retransmission is received after reception of a DL initial transmission.

Value of drx-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

RRC_IDLE DRX

In the RRC_IDLE state and the RRC_INACTIVE state, DRX is used to receive a paging signal discontinuously. For convenience, DRX performed in the RRC_IDLE (or RRC_INACTIVE) state is referred to as RRC_IDLE DRX.

Therefore, when DRX is configured, PDCCH monitoring/reception may be performed discontinuously in the time domain in the afore-described/proposed procedures and/or methods.

Referring to FIG. 6(b), DRX may be configured for discontinuous reception of a paging signal. The UE may receive DRX configuration information from the BS by higher-layer (e.g., RRC) signaling. The DRX configuration information may include a DRX cycle, a DRX offset, configuration information for a DRX timer, and the like. The UE repeats an On Duration and a Sleep duration according to a DRX cycle. The UE may operate in a wakeup mode during the On duration and in a sleep mode during the Sleep duration. In the wakeup mode, the UE may monitor a paging occasion (PO) to receive a paging message. A PO means a time resource/interval (e.g., subframe or slot) in which the UE expects to receive a paging message. PO monitoring includes monitoring a PDCCH (MPDCCH or NPDCCH) scrambled with a P-RNTI (hereinafter, referred to as a paging PDCCH) in a PO. The paging message may be included in the paging PDCCH or in a PDSCH scheduled by the paging PDCCH. One or more POs may be included in a paging frame (PF), and the PF may be periodically configured based on a UE ID. A PF may correspond to one radio frame, and the UE ID may be determined based on the International Mobile Subscriber Identity (IMSI) of the UE. When DRX is configured, the UE monitors only one PO per DRX cycle. When the UE receives a paging message indicating a change of its ID and/or system information in a PO, the UE may perform an RACH procedure to initialize (or reconfigure) a connection with the BS, or receive (or obtain) new system information from the BS. Therefore, PO monitoring may be performed discontinuously in the time domain to perform an RACH procedure for connection to the BS or to receive (or obtain) new system information from the BS in the afore-described procedures and/or methods.

Bandwidth Part (BWP)

In the NR system to which the present disclosure is applicable, a frequency resource of up to 400 MHz may be allocated/supported for each CC. When a UE operating in such a wideband CC always operates with a radio frequency (RF) module for the entire CCs turned on, battery consumption of the UE may increase.

Alternatively, considering various use cases (e.g., enhanced mobile broadband (eMBB), ultra-reliable and low latency communication (URLLC), and massive machine type communication (mMTC), and so on) operating within a single wideband CC, a different numerology (e.g., SCS) may be supported for each frequency band within the CC.

Alternatively, the maximum bandwidth capability may be different for each UE.

In consideration of the above situation, the BS may indicate/configure the UE to operate only in a partial bandwidth instead of the entire bandwidth of the wideband CC. The partial bandwidth may be defined as a BWP.

A BWP may include consecutive RBs on the frequency axis, and one BWP may correspond to one numerology (e.g., SCS, CP length, slot/mini-slot duration, and so on).

The BS may configure a plurality of BWPs in one CC configured for the UE. For example, the BS may configure a BWP occupying a relatively small frequency region in a PDCCH monitoring slot, and schedule a PDSCH indicated by the PDCCH (or a PDSCH scheduled by the PDCCH) in a larger BWP. Alternatively, when UEs are concentrated on a specific BWP, the BS may configure another BWP for some of the UEs, for load balancing. Alternatively, the BS may exclude some spectrum of the entire bandwidth and configure both of the BWPs in the same slot in consideration of frequency-domain inter-cell interference cancellation between neighboring cells.

The BS may configure at least one DL/UL BWP for the UE associated with the wideband CC and activate at least one DL/UL BWP among the configured DL/UL BWP(s) at a specific time (through L1 signaling (e.g., DCI), MAC or RRC signaling, etc.). The activated DL/UL BWP may be called an active DL/UL BWP. The UE may fail to receive DL/UL BWP configurations from the BS during an initial access procedure or before setting up an RRC connection. A DL/UL BWP assumed by such a UE is defined as an initial active DL/UL BWP.

2. Positioning

Positioning may refer to determining the geographical position and/or velocity of the UE based on measurement of radio signals. Location information may be requested by and reported to a client (e.g., an application) associated with to the UE. The location information may also be requested by a client within or connected to a core network. The location information may be reported in standard formats such as formats for cell-based or geographical coordinates, together with estimated errors of the position and velocity of the UE and/or a positioning method used for positioning.

2.1. Positioning Protocol Configuration

FIG. 7 is a diagram illustrating an exemplary positioning protocol configuration for positioning a UE, to which the embodiment is applicable.

Referring to FIG. 7, an LTE positioning protocol (LPP) may be used as a point-to-point protocol between a location server (E-SMLC and/or SLP and/or LMF) and a target device (UE and/or SET), for positioning the target device using position-related measurements obtained from one or more reference resources. The target device and the location server may exchange measurements and/or location information based on signal A and/or signal B over the LPP.

NRPPa may be used for information exchange between a reference source (access node and/or BS and/or TP and/or NG-RAN node) and the location server.

The NRPPa protocol may provide the following functions.

E-CID Location Information Transfer. This function allows the reference source to exchange location information with the LMF for the purpose of E-CID positioning.

OTDOA Information Transfer. This function allows the reference source to exchange information with the LMF for the purpose of OTDOA positioning.

Reporting of General Error Situations. This function allows reporting of general error situations, for which function-specific error messages have not been defined.

2.2. PRS (Positioning Reference Signal)

For such positioning, a positioning reference signal (PRS) may be used. The PRS is a reference signal used to estimate the position of the UE.

A positioning frequency layer may include one or more PRS resource sets, each including one or more PRS resources.

Sequence Generation

A PRS sequence r(m) (m=0,1, . . . ) may be defined by Equation 1.

$$r(m) = \frac{1}{\sqrt{2}}(1 - 2c(m)) + j\frac{1}{\sqrt{2}}(1 - 2c(m+1)) \qquad \text{[Equation 1]}$$

c(i) may be a pseudo-random sequence. A pseudo-random sequence generator may be initialized by Equation 2.

$$c_{init} = \left(2^{22}\left\lfloor\frac{n_{ID,seq}^{PRS}}{1024}\right\rfloor + 2^{10}\left(N_{symb}^{slot}n_{s,f}^{\mu} + l + 1\right)\right. \qquad \text{[Equation 2]}$$

$$\left.\left(2\left(n_{ID,seq}^{PRS}\bmod 1024\right) + 1\right) + \left(n_{ID,seq}^{PRS}\bmod 1024\right)\right)\bmod 2^{31}n_{s,f}^{\mu}$$

may be a slot number in a frame in an SCS configuration μ. A DL PRS sequence ID $$n_{ID,seq}^{PRS} \in \{0, 1, \dots, 4095\}$$

may be given by a higher-layer parameter (e.g., DL-PRS-SequenceId). l may be an OFDM symbol in a slot to which the sequence is mapped.

Mapping to Physical Resources in a DL PRS Resource

A PRS sequence r(m) may be scaled by BPRS and mapped to REs $(k,l)_{p,\mu}$ specifically by Equation 3. $(k,l)_{p,\mu}$ may represent an RE (k,l) for an antenna port p and the SCS configuration μ.

$$a_{k,l}^{(p,\mu)} = \beta_{PRS}r(m) \qquad \text{[Equation 3]}$$

$$m = 0, 1, \dots$$

$$k = mK_{comb}^{PRS} + \left(\left(k_{offset}^{PRS} + k'\right)\bmod K_{comb}^{PRS}\right)$$

$$l = l_{start}^{PRS}, l_{start}^{PRS} + 1, \dots, l_{start}^{PRS} + L_{PRS} - 1$$

Herein, the following conditions may have to be satisfied:

The REs $(k,l)_{p,\mu}$ are included in an RB occupied by a DL PRS resource configured for the UE;

The symbol l not used by any SS/PBCH block used by a serving cell for a DL PRS transmitted from the serving cell or indicated by a higher-layer parameter SSB-positionInBurst for a DL PRS transmitted from a non-serving cell;

A slot number satisfies the following PRS resource set-related condition;

$$I_{start}^{PRS}$$

is the first symbol of the DL PRS in the slot, which may be given by a higher-layer parameter DL-PRS-ResourceSymbolOffset. The time-domain size of the DL PRS resource, $L_{PRS} \in \{2,4,6,12\}$ may be given by a higher-layer parameter DL-PRS-NumSymbols. A comb size $$K_{comb}^{PRS} \in \{2, 4, 6, 12\}$$

may be given by a higher-layer parameter transmission-Comb. A combination $$\{L_{PRS}, K_{comb}^{PRS}\}$$

of $L_{PRS}$ and $$K_{comb}^{PRS}$$

may be one of $\{2, 2\}$, $\{4, 2\}$, $\{6, 2\}$, $\{12, 2\}$, $\{4, 4\}$, $\{12, 4\}$, $\{6, 6\}$, $\{12, 6\}$ and/or $\{12, 12\}$. An RE offset $$k_{offset}^{PRS} \in \{0, 1, \dots, K_{comb}^{PRS} - 1\}$$

may be given by combOffset. A frequency offset k' may be a function of $$l - l_{start}^{PRS}$$

as shown in Table 6.

TABLE 6

| $K_{comb}^{PRS}$ | Symbol within the downlink PRS resource $l - l_{start}^{PRS}$ | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

A reference point for k=0 may be the position of point A in a positioning frequency layer in which the DL PRS resource is configured. Point A may be given by a higher-layer parameter dl-PRS-PointA-r16.

Mapping to Slots in a DL PRS Resource Set

A DL PRS resource included in a DL PRS resource set may be transmitted in a slot and a frame which satisfy the following Equation 4.

$$\left(N_{slot}^{frame,\mu} n_f + n_{s,f}^{\mu} - T_{offset}^{PRS} - T_{offset,res}^{PRS}\right) \bmod 2^{\mu} T_{per}^{PRS} \in$$

$$\{i T_{gap}^{PRS}\}_{i=0}^{T_{rep}^{PRS}-1} N_{slot}^{frame,\mu}$$ [Equation 4]

may be the number of slots per frame in the SCS configuration $\mu$. $n_f$ may be a system frame number (SFN).

$$n_{s,f}^{\mu}$$

may be a slot number in a frame in the SCS configuration $\mu$. A slot offset $$T_{offset}^{PRS} \in \{0, 1, \dots, T_{per}^{PRS} - 1\}$$

may be given by a higher-layer parameter DL-PRS-ResourceSetSlotOffset. A DL PRS resource slot offset $$T_{offset,res}^{PRS}$$

may be given by a higher layer parameter DL-PRS-ResourceSlotOffset. A periodicity $$T_{per}^{PRS} \in \{4, 5, 8, 10, 16, 20, 32, 40,$$

$$64, 80, 160, 320, 640, 1280, 2560, 5120, 10240\}$$

may be given by a higher-layer parameter DL-PRS-Periodicity. A repetition factor $$T_{rep}^{PRS} \in \{1, 2, 4, 6, 8, 16, 32\}$$

may be given by a higher-layer parameter DL-PRS-ResourceRepetitionFactor. A muting repetition factor $$T_{muting}^{PRS}$$

may be given by a higher-layer parameter DL-PRS-MutingBitRepetitionFactor. A time gap $$T_{gap}^{PRS} \in \{1, 2, 4, 8, 16, 32\}$$

gap may be given by a higher-layer parameter DL-PRS-ResourceTimeGap.

2.3. UE Positioning Architecture

FIG. 8 illustrates an exemplary system architecture for measuring positioning of a UE to which the embodiment is applicable.

Referring to FIG. 8, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QOS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.4. Operation for UE Positioning

FIG. 9 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 9. In other words, in FIG. 9 it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 9. In step 1*a*, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1*b*. For example, the serving AMF may determine that itself will perform the location service in order to measure the position of the UE for an emergency call.

In step 2, the AMF transfers the request for the location service to an LMF. In step 3*a*, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3*a* may be an NRPPa protocol which will be described later.

Additionally, in step 3*b*, the LMF may initiate a location procedure for DL positioning together with the UE. For example, the LMF may transmit the location assistance data to the UE or obtain a location estimate or location measurement value. For example, in step 3*b*, a capability information transfer procedure may be performed. Specifically, the LMF may transmit a request for capability information to the UE and the UE may transmit the capability information to the LMF. Here, the capability information may include information about a positioning method supportable by the LMF or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3*b*, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3*b*, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 9 has been initiated by step 1a, the AMF may transfer the location service response to a 5GC entity such as a GMLC. If the procedure of FIG. 9 has been initiated by step 1b, the AMF may use the location service response in order to provide a location service related to an emergency call.

2.5. Positioning Protocol

LTE Positioning Protocol (LPP)

FIG. 10 illustrates an exemplary protocol layer used to support LPP message transfer between an LMF and a UE. An LPP protocol data unit (PDU) may be carried in a NAS PDU between an AMF and the UE.

Referring to FIG. 10, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

NR Positioning Protocol A (NRPPa)

FIG. 11 illustrates an exemplary protocol layer used to support NRPPa PDU transfer between an LMF and an NG-RAN node.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.6. Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

OTDOA (Observed Time Difference Of Arrival)

FIG. 12 is a diagram illustrating an observed time difference of arrival (OTDOA) positioning method, to which the embodiment is applicable;

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 5 below.

$$RSTDi_{,1} = \frac{\sqrt{(x_i - x_t)^2 + (y_{t-} y_i)^2}}{c} - \frac{\sqrt{(x_t - x_1)^2 + (y_t - y_1)^2}}{c} + (T_i - T_t) + (n_i - n_1) \qquad \text{[Equation 5]}$$

In Equation 5, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i\text{-}T_1)$ is a transmission time offset between two TPs, referred to as "real time differences" (RTDs), and $n_i$ and $n_1$ are UE ToA measurement error values.

E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB Rx-Tx time difference, timing advance ($T_{ADV}$), and/or AoA Here, $T_{ADV}$ may be divided into Type 1 and Type 2 as follows.

$T_{ADV}$ Type 1=(ng-eNB Rx-Txtime difference)+(UE E-UTRA Rx-Txtime difference)

$T_{ADV}$ Type 2=ng-eNB Rx-Txtime difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

Multi RTT (Multi-Cell RTT)

FIG. 13 is a diagram illustrating an exemplary multi-round trip time (multi-RTT) positioning method to which the embodiment is applicable.

Referring to FIG. 13(a), an exemplary RTT procedure is illustrated, in which an initiating device and a responding device perform ToA measurements, and the responding device provides ToA measurements to the initiating device, for RTT measurement (calculation). The initiating device may be a TRP and/or a UE, and the responding device may be a UE and/or a TRP.

In operation 1301 according to the embodiment, the initiating device may transmit an RTT measurement request, and the responding device may receive the RTT measurement request.

In operation 1303 according to the embodiment, the initiating device may transmit an RTT measurement signal at t0 and the responding device may acquire a ToA measurement $t_1$.

In operation 1305 according to the embodiment, the responding device may transmit an RTT measurement signal at $t_2$ and the initiating device may acquire a ToA measurement $t_3$.

In operation 1307 according to the embodiment, the responding device may transmit information about $[t_2\text{-}t_1]$, and the initiating device may receive the information and calculate an RTT by Equation 6. The information may be transmitted and received based on a separate signal or in the RTT measurement signal of operation 1305.

$$RTT = t_3 - t_0 - [t_2 - t_1] \qquad \text{[Equation 6]}$$

Referring to FIG. 13(b), an RTT may correspond to a double-range measurement between two devices. Positioning estimation may be performed from the corresponding information, and multilateration may be used for the positioning estimation. $d_1$, $d_2$, and $d_3$ may be determined based on the measured RTT, and the location of a target device may be determined to be the intersection of the circumferences of circles with radiuses of $d_1$, $d_2$, and $d_3$, in which $BS_1$, $BS_2$, and $BS_3$ (or TRPs) are centered respectively.

2.7. Sounding Procedure

In a wireless communication system to which the embodiment is applicable, an SRS for positioning may be used.

An SRS-Config information element (IE) may be used to configure SRS transmission. (A list of) SRS resources and/or (a list of) SRS resource sets may be defined, and each resource set may be defined as a set of SRS resources.

The SRS-Config IE may include configuration information on an SRS (for other purposes) and configuration information on an SRS for positioning separately. For example, configuration information on an SRS resource set for the SRS (for other purposes) (e.g., SRS-ResourceSet) and configuration information on an SRS resource set for the SRS for positioning (e.g., SRS-PosResourceSet) may be included separately. In addition, configuration information on an SRS resource for the SRS (for other purposes) (e.g., SRS-ResourceSet) and configuration information on an SRS resource for the SRS for positioning (e.g., SRS-PosRe-source) may be included separately.

An SRS resource set for positioning may include one or more SRS resources for positioning. Configuration information on the SRS resource set for positioning may include: information on an identifier (ID) that is assigned/allocated/related to the SRS resource set for positioning; and information on an ID that is assigned/allocated/related to each of the one or more SRS resources for positioning. For example, configuration information on an SRS resource for positioning may include an ID assigned/allocated/related to a UL resource. In addition, each SRS resource/SRS resource set for positioning may be identified based on each ID assigned/allocated/related thereto.

The SRS may be configured periodically/semi-persistently/aperiodically.

An aperiodic SRS may be triggered by DCI. The DCI may include an SRS request field.

Table 7 shows an exemplary SRS request field.

TABLE 7

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 00 | No aperiodic SRS resource set triggered | No aperiodic SRS resource set triggered |
| 01 | SRS resource set(s) configured by SRS-ResourceSet with higher layer parameter aperiodicSRS-Resource Trigger set to 1 or an entry in aperiodicSRS-Resource TriggerList set to 1 SRS resource set(s) configured by SRS-PosResourceSet with an entry in aperiodicSRS-Resource TriggerList set to 1 when triggered by DCI formats 0_1, 0_2, 1_1, and 1_2 | SRS resource set(s) configured with higher layer parameter usage in SRS-ResourceSet set to 'antennaSwitching' and resource Type in SRS-ResourceSet set to 'aperiodic' for a 1$^{st}$ set of serving cells configured by higher layers |
| 10 | SRS resource set(s) configured by SRS-ResourceSet with higher layer parameter aperiodicSRS-Resource Trigger set to 2 or an entry in aperiodicSRS-Resource TriggerList set to 2 SRS resource set(s) configured by SRS-PosResourceSet with an entry in aperiodicSRS-Resource TriggerList set to 2 when triggered by DCI formats 0_1, 0_2, 1_1, and 1_2 | SRS resource set(s) configured with higher layer parameter usage in SRS-ResourceSet set to 'antennaSwitching' and resource Type in SRS-ResourceSet set to 'aperiodic' for a 2$^{nd}$ set of serving cells configured by higher layers |
| 11 | SRS resource set(s) configured by SRS-ResourceSet with higher layer parameter aperiodicSRS-Resource Trigger set to 3 or an entry in aperiodicSRS-Resource TriggerList set to 3 SRS resource set(s) configured | SRS resource set(s) configured with higher layer parameter usage in SRS-ResourceSet set to 'antennaSwitching' and resource Type |

TABLE 7-continued

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| | by SRS-PosResourceSet with an entry in aperiodicSRS-Resource TriggerList set to 3 when triggered by DCI formats 0_1, 0_2, 1_1, and 1_2 | in SRS-ResourceSet set to 'aperiodic' for a 3$^{rd}$ set of serving cells configured by higher layers |

In Table 7 srs-TPC-PDCCH-Group is a parameter for setting the triggering type for SRS transmission to type A or type B. aperiodicSRS-ResourceTriggerList is a parameter for configuring an additional list of DCI code points where the UE needs to transmit the SRS according to the SRS resource set configuration, aperiodicSRS-ResourceTrigger is a parameter for configuring a DCI code point where the SRS needs to be transmitted according to the SRS resource set configuration, and resourceType is a parameter for configuring (periodic/semi-static/aperiodic) time domain behavior of the SRS resource configuration.

3. Embodiment

A detailed description will be given of the embodiment based on the above technical ideas. The afore-described contents of Section 1 and Section 2 are applicable to the embodiment described below. For example, operations, functions, terminologies, and so on which are not defined in the embodiment may be performed and described based on Section 1 and Section 2.

Symbols/abbreviations/terms used in the description of the embodiment may be defined as follows.

A/B/C: A and/or B and/or C

LMF: location management function

MAC: medium access control

MAC-CE: MAC-control element

OTDOA (OTDoA): observed time difference of arrival

PRS: positioning reference signal

RS: reference signal

RSTD: reference signal time difference/relative signal time difference

SRS: sounding reference signal. According to the embodiment, the SRS may be used for UL channel estimation and positioning measurement using multiple-input multiple-output (MIMO). In other words, according to the embodiment, the SRS may include a normal SRS and a positioning SRS. According to the embodiment, the positioning SRS may be understood as a UL RS configured for positioning of the UE and/or used for positioning of the UE. According to the embodiment, the normal SRS, which is contrasted with the positioning SRS, may be understood as a UL RS configured for UL channel estimation and/or used for UL channel estimation (and/or configured for UL channel estimation and positioning and/or used for UL channel estimation and positioning). According to the embodiment, the positioning SRS may also be called an SRS for positioning. In a description of the embodiment, terms such as the positioning SRS and the SRS for positioning may be used interchangeably and may be understood as having the same meaning. According to the embodiment, the normal SRS may also be referred to as a legacy SRS, a MIMO SRS, or an SRS for MIMO. In a description of the embodiment, terms such as normal SRS, legacy SRS, MIMO SRS, and SRS for MIMO may be used interchangeably and may be understood as having the same meaning. For example, the normal SRS and the positioning SRS may be separately configured/indicated. For example, the normal SRS and the positioning SRS may be configured/indicated by different IEs of higher layers. For example, the normal SRS may be configured based on an SRS-resource. For example, the positioning SRS may be configured based on an SRS-PosResource.

SS: synchronization signal

SSB: synchronization signal block

SS/PBCH: synchronization signal/physical broadcast channel

TDOA (TDoA): time difference of arrival

TOA (ToA): time of arrival

TRP: transmission and reception point (TP: transmission point)

In the description of the embodiment, a BS may be understood as a comprehensive term including a remote radio head (RRH), an eNB, a gNB, a TP, a reception point (RP), a relay, and the like.

In the description of the embodiment, the expression 'greater than/above A' may be replaced with the expression 'above/greater than A'.

In the description of the embodiment, the expression 'less than/below B' may be replaced with the expression 'below/less than B'.

For positioning of the UE, the NR system prior to legacy Rel-17 has supported the entire procedure in which the UE receives a PRS and reports the analysis of the received PRS to the BS/server only in an RRC connected state. Likewise, UL positioning measurement through SRS transmission may also be supported only in the RRC connected state. Various applications including supporting more accurate use cases for an industrial Internet-of-things (IIoT) environment RRC inactive state have been required. Accordingly, in Rel-17, positioning measurement in the RRC inactive state has been determined to be supported. Resources related to the PRS and the SRS may be configured for gain not only within an initial bandwidth part (BWP) but also outside the initial BWP in terms of accuracy.

According to the embodiment, BWP switching control for the SRS for positioning of the UE is described in case of configuring the initial BWP and a separate BWP for the SRS for positioning during SRS transmission in the RRC inactive state at the UE side.

The embodiment may be related to a priority rule between the SRS and other UL channels in the RRC inactive state.

FIG. 14 is a simplified diagram illustrating an operating method of a UE, a TRP, a location server, and/or an LMF according to the embodiment.

Referring to FIG. 14, in operation 1201 according to the embodiment, the location server and/or the LMF may transmit configuration indicated to the UE and the UE may receive the configuration information.

In operation 1203 according to the embodiment, the location server and/or the LMF may transmit reference configuration information to the TRP and the TRP may receive the reference configuration information. In operation 1205 according to the embodiment, the TRP may transmit the reference configuration information to the UE and the UE may receive the reference configuration information. In this case, operation 1201 according to the embodiment may be omitted.

In contrast, operations 1203 and 1205 according to the embodiment may be omitted. In this case, operation 1201 according to the embodiment may be performed.

That is, operation 1201 according to the embodiment, and operations 1203 and 1205 according to the embodiment may be selectively performed.

In operation 1207 according to the embodiment, the TRP may transmit a signal related to the configuration information and the UE may receive the signal related to the configuration information. For example, the signal related to the configuration information may be a signal for positioning of the UE.

In operation 1209 according to the embodiment, the UE may transmit a signal related to positioning to the TRP and the TRP may receive the signal related to positioning. In operation 1211 according to the embodiment, the TRP may transmit the signal related to positioning to the location server and/or the LMF and the location server and/or the LMF may receive the signal related to positioning.

In operation 1213 according to the embodiment, the UE may transmit the signal related to positioning to the location server and/or the LMF and the location server and/or the LMF may receive the signal related to positioning. In this case, operations 1209 and 1211 according to the embodiment may be omitted.

In contrast, operation 1213 according to the embodiment may be omitted. In this case, operations 1209 and 1211 according to the embodiment may be performed.

That is, operations 1209 and 1211 according to the embodiment, and operation 1213 according to the embodiment may be selectively performed.

According to the embodiment, the signal related to positioning may be obtained based on the configuration information and/or the signal related to the configuration information.

FIG. 15 is a simplified diagram illustrating an operating method of a UE, a TRP, a location server, and/or an LMF according to the embodiment.

Referring to FIG. 15(a), in operation 1301(a) according to the embodiment, the UE may receive configuration information.

In operation 1303(a) according to the embodiment, the UE may receive a signal related to the configuration information.

In operation 1305(a) according to the embodiment, the UE may transmit information related to positioning.

Referring to FIG. 15(b), in operation 1301(b) according to the embodiment, the TRP may receive configuration information from the location server and/or the LMF and transmit the configuration information to the UE.

In operation 1303(b) according to the embodiment, the TRP may transmit a signal related to the configuration information.

In operation 1305(b) according to the embodiment, the TRP may receive information related to positioning and transmit the information related to positioning to the location server and/or the LMF.

Referring to FIG. 15(c), in operation 1301(c) according to the embodiment, the location server and/or the LMF may transmit configuration information.

In operation 1305(c) according to the embodiment, the location server and/or the LMF may receive information related to positioning.

For example, the above-described configuration information may be understood as relating to reference configuration (information) or one or more pieces of information that the location server, the LMF, and/or the TRP transmits to/configures for the UE and/or may be understood as the reference configuration (information) or one or more pieces of information that the location server, the LMF, and/or the TRP transmits to/configures for the UE, in a description of the embodiment below.

For example, the above signal related to positioning may be understood as a signal related to one or more pieces of information that the UE reports and/or a signal including one or more pieces of information that the UE reports, in a description of the embodiment below.

For example, in a description of the embodiment below, the BS, the gNB, and the cell may be replaced with the TRP, the TP, or any device serving equally as the TRP or the TP.

For example, in a description of the embodiment below, the location server may be replaced with the LMF and any device serving equally as the LMF.

More detailed operations, functions, terms, etc. in operation methods according to the embodiment may be performed and described based on the embodiment described later. The operation methods according to the embodiment is exemplary and one or more operations in the above-described operation methods may be omitted according to detailed content of each embodiment.

Hereinafter, the embodiment will be described in detail. It may be understood by those of ordinary skill in the art that the embodiment described below may be combined in whole or in part to implement other embodiments unless mutually exclusive.

In a system from Rel-17 or beyond, positioning measurement may be supported even in the inactive state as well as in an RRC connected state. In this case, the BS suspends information about an SRS resource that the UE should transmit during UL measurement or DL and UL positioning measurement such as multi-RTT with respect to resources that have already been received in the connected state through a message for releasing RRC connection, so that the UE may transmit an SRS based on a corresponding configuration in the inactive state. In addition, related information may be transmitted to the UE through a physical channel used for data transmission such as configured grant-based small data transmission (SDT) or random access-based small data transmission (RA-SDT) to the UE in the inactive state.

In the system from Rel-17 or beyond, a resource configuration for an SRS for positioning in the RRC inactive state may be configured within an initial BWP or may be configured by indicating a BWP only for SRS transmission for positioning.

The embodiment may be related to BWP switching control for the SRS for positioning of the UE when an initial BWP and a separate BWP for the SRS for positioning are configured during SRS transmission in the RRC inactive state at the UE side.

In a description of the embodiment, an SRS transmitted for a positioning purpose may be referred to as an SRS for positioning, i.e., an SRSp.

In a description of the embodiment, a separately configured BWP for SRSp may be referred to as a BWP for SRSp, i.e., SRSpBWP.

Resource configuration information for SRSp may be transmitted through RRC or system information. SRSp may be UE-specifically configured. SRSp may be transmitted according to configuration such as a hopping pattern or a bandwidth size given in an active BWP.

Basically, SRSp may be transmitted after a separate resource is configured within an initial BWP. Additionally/alternatively, according to the embodiment, the BS may configure a separate BWP for SRSp transmission in addition to the initial BWP (e.g. BWP0) for the UE.

FIG. 16 illustrates an example of configuring a BWP for SRSp to which the embodiment is applicable. In FIG. 16, an example of configuring a separate BWP for SRSp transmission is illustrated.

FIG. 17 illustrates an example of BWP switching for an SRSp to which the embodiment is applicable. In FIG. 17, an example of BWP switching between an SRSpBWP and BWP0 is illustrated.

Referring to FIG. 16, a BS may configure a separate BWP for SRSp transmission in addition to an initial BWP (e.g., BWP0) for a UE.

The initial BWP may be configured based on an offset value (OffsetTocarrier) (for BWP #0) from CRB0.

A BWP for an SRSp may be configured based on an offset value (OffsetTocarrier) (for BWP #n of the SRSp).

During measurement report (MR), the UE may be requested perform BWP switching from BWP0 to an SRSpBWP.

After the UE switches to the SRSpBWP, if there is a paging occasion (PO) that the UE should monitor on the time axis, the UE should switch to the initial BWP again to measure paging. After monitoring paging, the UE may need to attempt to perform BWP switching for SRSp transmission.

Referring to FIG. 17, when there is no separate switching control, if the periodicity of a PO is short, the UE may frequently perform BWP switching, which may increase power consumption of the UE and waste resources during a switching period.

According to the embodiment, a method for preventing indiscriminate BWP switching may be provided.

According to the embodiment, triggering for MR of the UE may be regarded as triggering delivery of information about an SRSp resource in an inactive state through an RRC message or MAC. According to the embodiment, when the UE is configured with an SRS resource, the UE may expect that an SRSp will be transmitted on the nearest SRS resource or BWP switching to a neighbor SRSpBWP will be performed.

According to the embodiment, the UE may expect that the SRSp will be transmitted in the following three scenarios.

1) When transmission is allowed only within an initial BWP

2) When SRSp transmission is allowed only within an SRSpBWP

3) When SRSp transmission is allowed both within the initial BWP and within the SRSpBWP According to the embodiment, when the SRSpBWP of the UE is configured as a single BWP of BWP0, the BS may recognize that the scenario 1) is assumed. According to the embodiment, when the UE provides additional SRSpBWP information, the BS may selectively transmit one constraint scenario from among 2) and 3) to the UE or may be determined as a single constraint scenario by regulations. This is because the BS may want to protect other UL channels from the SRSp.

According to the embodiment, related information may be delivered through RRC or system information. According to the embodiment, related information may be configured as a unified bit so that 'off' (0) may indicate scenario 2) to the UE and 'on' (1) may indicate that the operation for scenario 3) is configured for the UE. Here, in the case of scenarios 2) and 3), since the SRSp is allowed within the SRSpBWP, BWP switching is required. Therefore, the BS may control BWP switching through the following methods.

Method #1: Separate Window Configuration Through BWP Switching is Allowed

In accordance with Method #1 according to the embodiment, a separate window that allows BWP switching of the UE may be configured.

According to the embodiment, it may be expected that the UE will basically perform BWP switching from BWP0 to the SRSpBWP for SRSp transmission within a separate window and will not perform BWP switching outside the separate window.

Additionally/alternatively, according to the embodiment, the window may be considered as a duration in which switching to the SRSpBWP is not allowed so that it may be expected that the UE will perform switching to the SRSpBWP only outside the window. In the latter case, switching to BWP0 may be restricted so that the BS may directly concentrate only on SRSp transmission.

Method #1-Usage #1: Configuration Starting from Reference Channel

According to the embodiment, Usage #1 may be a method of starting a window from a starting point described below and activating the window during a duration indicated/configured by the BS.

1) Start/Last Symbol of Channel Used for SRSp Transmission Request

According to the embodiment, when a request message for SRSp transmission is configured for the UE through RRC or MAC, the start or last symbol of a physical channel through which related information is delivered becomes the starting point of the window. For example, the start or last symbol of a channel carrying a request for measurement performed by a paging procedure or resource information for the SRSp may be the starting point. Alternatively, the starting point of a slot or a frame nearest to the corresponding channel may be the starting point of the window.

2) Start or Last Symbol of Adjacent PO

According to the embodiment, since the UE expects that a PDCCH will be paged in a PO thereof at every DRX cycle, the UE may expect that the window will be valid for a preset period based on the start or last symbol of the nearest PO after receiving an SRS transmission request. Here, the starting point of a slot or a frame nearest to the corresponding channel may be the starting point of the window.

3) Start or Last Symbol of SSB

According to the embodiment, like the PO described in 1), the UE expects that an SSB will be monitored for synchronization. Therefore, according to the embodiment, the SSB may be a reference point for starting the window, and the start or last symbol of the SSB may be the reference point. Additionally/alternatively, according to the embodiment, the starting point of a slot or a frame nearest to the corresponding channel may be the starting point of the window.

According to the embodiment, the BS may also deliver time offset information from the above-described reference channel. According to the embodiment, the window may be activated after a time offset which is configured based on the time point described in 1), 2), or 3). According to the embodiment, the offset may be indicated/configured in units of one of symbols/slots/subframes/frames.

Usage #2: Window Configuration Based on Absolute Time (SFN #0)

According to the embodiment, Usage #2 is a method in which, unlike Usage #1, the BS directly configures the start point/duration/periodicity of the window based on an absolute time such as SFN #0 and transmits the configured window to the UE. To obtain related information, an LMF may make a request for preferred values to the BS. The BS may configure a one-time window through a time offset and a duration or configure a periodic window together with periodicity information. In this case, the unit of the time offset/duration/periodicity may be individually indicated and configured in units of symbols/slots/subframes/frames.

Method #2: Direct Configuration/Indication of Maximum Number of Times for BWP Switching According to the embodiment, Method #2 is a method in which the BS or the LMF directly configures/indicates the allowable number of times of switching for/to the UE. For example, when the allowable number of times is set to 8 and is defined based on a round trip, it may be expected that the UE will attempt to perform BWP switching from BWP0 to the SRSpBWP up to 8 times and will not perform switching thereafter. For example, if the allowable number of times is defined based on one-way rather than round trip, the UE performs BWP switching up to 8 times based on the single number of times for occurrence of BWP switching.

Method #3: Direct Configuration/Indication of Maximum Number of Times by which Switching to BWP0 are not Allowed N Times after BWP Switching to SRSpBWP According to the embodiment, in method #3, after a time point at which a measurement request and/or SRSp resource configuration information is received from the UE, it is expected that the UE will basically perform BWP switching to the SRSpBWP, and then the UE may continuously transmit only an SRSp without performing BWP switching, even though BWP switching to an initial BWP should have been performed, according to an N value configured by the BS and may perform BWP switching to an initial BWP at a switching time point of N+1.

According to the embodiment, Method #3 may be applied when the BS determines that positioning is more important than other procedures in the initial BWP. In this case, a channel or a procedure to be monitored for the initial BWP may be defined based on rules. For example, a PRACH may be counted once but paging may not be counted. Alternatively, paging may be counted but the PRACH may not be counted. Alternatively, SDT may be counted once, and the UE may basically perform BWP switching for an undetermined channel procedure and may not count the undetermined procedure. In order to accurately count BWP switching at the BS and the UE and align the number of times of BWP switching, the BS and the UE may count channels or procedures that should exist within the initial BWP based on monitoring (e.g., PO) and periodic rules, and these procedures or channels may be defined according to regulations.

Method #4: (De)Activation Command

According to the embodiment, Method #4 is a method in which the BS directly informs the UE of an activation signal indicating the start of the window through RRC or MAC and allows the UE to perform BWP switching unless there is additional deactivation command.

Additionally/alternatively, according to the embodiment, activation may mean providing a measurement request or SRSp resource information. According to the embodiment, the UE may recognize that switching is repeatable until a deactivation command is given.

Additionally and/or alternatively, according to the embodiment, when the UE performs BWP switching to the SRSpBWP once within a corresponding duration, it may be expected that the UE will not perform BWP switching to BWP0 from the SRSpBWP by considering that an initial BWP is limited for paging or an RACH. In contrast, according to the embodiment, if there is no separate deactivation after activation, it may be expected that the UE will not perform BWP switching to the initial BWP.

For example, in the case of SP-SRSp, an SRSp transmission duration is configured, and the UE may expect that BWP switching will not be allowed during that duration unless there is separate deactivation.

Method #5: Indication of Pattern for on/Off Through Bitmap

According to the embodiment, Method #5 may be a method in which the BS directly allows or disallows switching by processing time points at which switching may be implicitly performed as a bitmap. For example, when it is expected that BWP switching will be performed four times within an SP-SRSp transmission duration, the BS may set the bitmap to '1001' so that only first BWP switching and fourth BWP switching are allowed. Alternatively, a predetermined bitmap is configured with respect to the number of repetitions so that BWP switching may be performed with a periodic pattern. Alternatively, the bitmap is configured with respect to the number of repetitions as a hierarchical structure so that BWP switching may be indicated and configured using 'on/off'.

According to the embodiment, there may be a tradeoff between accuracy and power consumption of the UE according to bandwidth size.

According to the embodiment, since there is each use case in which the power consumption of the UE is prioritized or accuracy is prioritized, the BS may initially configure/indicate a plurality of SRSpBWPs with different bandwidth sizes for/to the UE.

For example, the BS may instruct the UE to maintain configuration of the SRSp in an inactive state through a connection release message. For example, the BS may indicate, to the UE, whether each BWP is suspended so as to use the BWP in the inactive state by suspending specific BWPs among a plurality of BWPs through a suspending message with respect to a plurality of SRSpBWPs that has already been received in a connection state. For example, the relationship between a suspended BWP and a BWP ID associated therewith may also be maintained in the inactive state. Thereafter, the BS may instruct the UE to perform BWP switching to a specific SRSpBWP by designating a BWP ID through RRC or MAC in the process of a paging procedure, an RACH procedure, or an SDT procedure. For related information, the UE or the LMF may make a request to the BS for a specific BW size or entire resource configuration related thereto on demand.

As another example, a plurality of SRSpBWPs may be configured for the UE in the inactive state. After configuration, the UE may be configured/indicated to perform switching to a specific SRSpBWP through a measurement request. For example, an SRS for positioning may also be used in the inactive state of a normal SRS (a legacy SRS or a MIMO SRS, different from the positioning SRS) used for beam management, channel estimation, and/or antenna switching.

According to the embodiment, different SRSpBWPs may be configured/indicated for respective aperiodic/semi-persistent/periodic SRSp transmission types. According to the embodiment, the UE may separately report the maximum number of BWPs supported by the UE in the inactive state during a capability report. In addition, the UE may also perform a report on whether BWP switching may be performed.

According to the embodiment, the above-described switching method that occurs in the inactive state may be applied not only to the SRS but also to a signal that may be transmitted by configuring an additional BWP. This is because the method according to the embodiment is to reduce additional power consumption generated by the UE in the inactive state and to achieve resource efficiency due to switching to a separate BWP as well as to an initial BWP.

For example, when the BS individually configures a BWP for SDT and configures a plurality of resources in the corresponding BWP and when there is paging message delivery to the initial BWP during data transmission, the method according to the embodiment may also be applied.

FIG. 18 is a diagram schematically illustrating an operation method of a UE and a network node according to the embodiment.

FIG. 19 is a flowchart illustrating an operating method of a UE according to the embodiment.

FIG. 20 is a flowchart illustrating an operating method of a network node according to the embodiment. For example, the network node may be a TP, a BS, a cell, a location server, an LMF, and/or any device that performs the same operation.

Referring to FIGS. 18 to 20, in operations 1801, 1901, and 2001 according to the embodiment, the network node may transmit information about a first UL BWP, and the UE may receive/acquire the information.

In operations 1803, 1903, and 2003 according to the embodiment, the network node may transmit information about an SRS resource for transmission of an SRS for positioning in an RRC inactive state, and the UE may receive/acquire the information.

According to the embodiment, the SRS resource may be included in a second UL BWP different from the first UL BWP.

In operations 1805, 1905, and 2005 according to the embodiment, the UE may transmit the SRS in the RRC inactive state and the network node may receive the SRS.

According to the embodiment, the SRS may be transmitted on the SRS resource based on (i) a window related to BWP switching being configured in the time domain and (ii) the SRS being transmitted within the window.

Specific operations of the UE and/or the network node according to the above-described the embodiment may be described and performed based on Section 1 to Section 3 described before.

Since examples of the above-described proposal method may also be included in one of implementation methods of the embodiment, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

4. Exemplary Configurations of Devices Implementing the Embodiment 4.1. Exemplary Configurations of Devices to which the Embodiment is Applied FIG. 21 is a diagram illustrating a device that implements the embodiment.

The device illustrated in FIG. 21 may be a UE and/or a BS (e.g., eNB or gNB or TP) and/or a location server (or LMF) which is adapted to perform the above-described mechanism, or any device performing the same operation.

Referring to FIG. 21, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 21 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 21 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor of a UE (or a communication device included in the UE) and/or a BS (or a communication device included in the BS) and/or a location server (or a communication device included in the location server) may operate by controlling a memory, as follows.

According to the embodiment, the UE or the BS or the location server may include at least one transceiver, at least one memory, and at least one processor coupled to the at least one transceiver and the at least one memory. The at least one memory may store instructions which cause the at least one processor to perform the following operations.

The communication device included in the UE or the BS or the location server may be configured to include the at least one processor and the at least one memory. The communication device may be configured to include the at least one transceiver or to be coupled to the at least one transceiver without including the at least one transceiver.

The TP and/or the BS and/or the cell and/or the location server and/or the LMF and/or any device performing the same operation may be referred to as a network node.

According to the embodiment, at least one processor included in the UE (or at least one processor of a communication device included in the UE) may be configured to acquire information about a first UL BWP.

According to the embodiment, the at least one processor included in the UE may be configured to acquire information about an SRS resource for transmission of an SRS for positioning in an RRC inactive state.

According to the embodiment, the SRS resource may be included in a second UL BWP different from the first UL BWP.

According to the embodiment, the at least one processor included in the UE may be configured to transmit the SRS in the RRC inactive state.

According to the embodiment, the SRS may be transmitted on the SRS resource, based on (i) a window related to BWP switching being configured in a time domain and (ii) the SRS being transmitted within the window.

According to the embodiment, at least one processor included in the network node (or at least one processor of a communication device included in the network node) may be configured to transmit information about a first UL BWP.

According to the embodiment, the at least one processor included in the network node may be configured to transmit information about an SRS resource for reception of an SRS for positioning in an RRC inactive state.

According to the embodiment, the SRS resource may be included in a second UL BWP different from the first UL BWP.

According to the embodiment, the at least one processor included in the network node may be configured to receive the SRS in the RRC inactive state.

According to the embodiment, the SRS may be transmitted on the SRS resource, based on (i) a window related to BWP switching being configured in a time domain and (ii) the SRS being transmitted within the window.

Specific operations of the UE and/or the network node according to the above-described the embodiment may be described and performed based on Section 1 to Section 3 described before.

Unless contradicting each other, the embodiment may be implemented in combination. For example, (the processor included in) the UE and/or the network node according to the embodiment may perform operations in combination of the embodiments of the afore-described in Section 1 to Section 3, unless contradicting each other.

4.2. Example of Communication System to which the Embodiment is Applied

In the present specification, the embodiment have been mainly described in relation to data transmission and reception between a BS and a UE in a wireless communication system. However, the embodiment is not limited thereto. For example, the embodiment may also relate to the following technical configurations.

The various descriptions, functions, procedures, proposals, methods, and/or operational flowcharts of the embodiment described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 22 illustrates an exemplary communication system to which the embodiment is applied.

Referring to FIG. 22, a communication system 1 applied to the embodiment includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/ network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the embodiment.

Example of Wireless Devices to which the Embodiment is Applied

FIG. 23 illustrates exemplary wireless devices to which the embodiment is applicable.

Referring to FIG. 23, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. W1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the embodiment, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the embodiment, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to the embodiment, one or more memories (e.g., 104 or 204) may store instructions or programs which, when executed, cause one or more processors operably coupled to the one or more memories to perform operations according to the embodiment or implementations of the present disclosure.

According to the embodiment, a computer-readable storage medium may store one or more instructions or computer programs which, when executed by one or more processors, cause the one or more processors to perform operations according to the embodiment or implementations of the present disclosure.

According to the embodiment, a processing device or apparatus may include one or more processors and one or more computer memories connected to the one or more processors. The one or more computer memories may store instructions or programs which, when executed, cause the one or more processors operably coupled to the one or more memories to perform operations according to the embodiment or implementations of the present disclosure.

Example of Using Wireless Devices to which the Embodiment is Applied

FIG. 24 illustrates other exemplary wireless devices to which the embodiment is applied. The wireless devices may be implemented in various forms according to a use case/service (see FIG. 22).

Referring to FIG. 24, wireless devices 100 and 200 may correspond to the wireless devices 100 and 200 of FIG. 22 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. W1), the vehicles (100b-1 and 100b-2 of FIG. W1), the XR device (100c of FIG. W1), the hand-held device (100d of FIG. W1), the home appliance (100e of FIG. W1), the IoT device (100f of FIG. W1), a digital broadcast terminal, a hologram device, a public safety device, an MTC device, a medicine device, a fintech device (or a finance device), a security device, a climate/environment device, the AI server/device (400 of FIG. W1), the BSs (200 of FIG. W1), a network node, etc. The wireless device may be used in a mobile or fixed place according to a use-example/service.

In FIG. 24, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 24 will be described in detail with reference to the drawings.

Example of Portable Device to which the Embodiment is Applied

FIG. 25 illustrates an exemplary portable device to which the embodiment is applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 25, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Example of Vehicle or Autonomous Driving Vehicle to which the Embodiment

FIG. 26 illustrates an exemplary vehicle or autonomous driving vehicle to which the embodiment. The vehicle or autonomous driving vehicle may be implemented as a mobile robot, a car, a train, a manned/unmanned aerial vehicle (AV), a ship, or the like.

Referring to FIG. 26, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, the embodiment may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multimode multi-band (MMMB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

The wireless communication technology in which the embodiment is implemented may include LTE, NR, and 6G, as well as narrowband Internet of things (NB-IoT) for low power communication. For example, the NB-IoT technology may be an example of low power wide area network (LPWAN) technology and implemented as the standards of LTE category (CAT) NB1 and/or LTE Cat NB2. However, these specific appellations should not be construed as limiting NB-IoT. Additionally or alternatively, the wireless communication technology implemented in a wireless device according to the embodiment may enable communication based on LTE-M. For example, LTE-M may be an example of the LPWAN technology, called various names such as enhanced machine type communication (eMTC). For example, the LTE-M technology may be implemented as, but not limited to, at least one of 1) LTE CAT 0, 2) LTE Cat M1, 3) LTE Cat M2, 4) LTE non-bandwidth limited (non-BL), 5) LTE-MTC, 6) LTE machine type communication, and/or 7) LTE M. Additionally or alternatively, the wireless communication technology implemented in a wireless device according to the embodiment may include, but not limited to, at least one of ZigBee, Bluetooth, or LPWAN in consideration of low power communication. For example, ZigBee may create personal area networks (PANs) related to small/low-power digital communication in conformance to various standards such as IEEE 802.15.4, and may be referred to as various names.

The embodiment may be implemented in various means. For example, the embodiment may be implemented in hardware, firmware, software, or a combination thereof.

In a hardware configuration, the methods according to exemplary embodiments may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiment may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the embodiment may be carried out in other specific ways than those set forth herein without departing from the spirit and essential characteristics of the embodiment. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment or included as a new claim by a subsequent amendment after the application is filed.

The embodiment is applicable to various wireless access systems including a 3GPP system, and/or a 3GPP2 system. Besides these wireless access systems, the embodiment is applicable to all technical fields in which the wireless access systems find their applications. Moreover, the proposed method can also be applied to mmWave communication using an ultra-high frequency band.

What is claimed is:

1. A method performed by a user equipment (UE) in a wireless communication system, the method comprising:
   receiving information related to a sounding reference signal (SRS) resource for positioning,
   wherein the SRS resource for positioning is configured outside an initial bandwidth part (BWP);
   based on the SRS resource having a switching time not being within an BWP switching prohibition window in a time domain, transmitting the SRS for positioning on the SRS resource in a radio resource control (RRC) INACTIVE mode.

2. The method of claim 1, wherein a start point of the BWP switching prohibition window in the time domain is identified based on a reference channel for configuring the BWP switching prohibition window.

3. The method of claim 2, further comprising
   receiving request information related to a request for the SRS,
   wherein the SRS is transmitted as a response to the request information, and
   wherein the start point of the BWP switching prohibition window is (i) a start symbol of the reference channel, (ii) a last symbol of the reference channel, (iii) a start symbol of a slot or a frame nearest to the reference channel, or (iv) a time point after a time offset configured from the reference channel, based on the reference channel being a channel to which the request information is mapped, and is configured as one unit among a symbol, a slot, a subframe, and a frame, related to the time offset.

4. The method of claim 3,
   wherein the start point of the BWP switching prohibition window is (i) a start symbol of a paging occasion (PO), (ii) a last symbol of the PO, (iii) a start symbol of a slot or a frame nearest to the PO, or (iv) a time point after a time offset configured from the PO, based on the reference channel being the PO, and is configured as one unit among a symbol, a slot, a subframe, and a frame, related to the time offset, and
   wherein the PO is a PO nearest to the reference channel to which the request information is mapped after the request information is received.

5. The method of claim 2,
   wherein the start point of the BWP switching prohibition window is (i) a start symbol of a synchronization signal block (SSB), (ii) a last symbol of the SSB, (iii) a start symbol of a slot or a frame nearest to the SSB, or (iv) a time point after a time offset configured from the SSB, based on the reference channel being the SSB, and is configured as one unit among a symbol, a slot, a subframe, and a frame, related to the time offset, and the SSB is an SSB used for synchronization acquisition.

6. A user equipment (UE) in a wireless communication system, the UE comprising:
   at least one processor; and
   at least one memory storing instructions thereon that, when executed by the at least one processor, cause the UE in a radio resource control (RRC) CONNECTED state to perform operations comprising:
   receiving information related to a sounding reference signal (SRS) resource for positioning,
   wherein the SRS resource for positioning is configured outside an initial bandwidth part (BWP); and
   based on the SRS resource having a switching time not being within an BWP switching prohibition window in a time domain, transmit the SRS for positioning on the SRS resource in a radio resource control (RRC) INACTIVE mode.

7. The UE of claim 6, wherein a start point of the BWP switching prohibition window in the time domain is identified based on a reference channel for configuring the BWP switching prohibition window.

8. The UE of claim 7,
   wherein the at least one processor is configured to receive request information related to a request for the SRS,
   wherein the SRS is transmitted as a response to the request information, and
   wherein the start point of the BWP switching prohibition window is (i) a start symbol of the reference channel, (ii) a last symbol of the reference channel, (iii) a start symbol of a slot or a frame nearest to the reference channel, or (iv) a time point after a time offset configured from the reference channel, based on the reference channel being a channel to which the request information is mapped, and is configured as one unit among a symbol, a slot, a subframe, and a frame, related to the time offset.

9. The UE of claim 6, wherein the at least one processor is configured to communicate with one or more of a UE, a network, and an autonomous driving vehicle other than a vehicle in which the UE is included.

10. A method performed by a base station in a wireless communication system, the method comprising:
   transmitting information related to a sounding reference signal (SRS) resource for positioning,
   wherein the SRS resource for positioning is configured outside an initial bandwidth part (BWP); and
   based on the SRS resource having a switching time not being within an BWP switching prohibition window in a time domain, receiving the SRS for positioning on the SRS resource in a radio resource control (RRC) INACTIVE mode.

* * * * *